(12) United States Patent
Yagi et al.

(10) Patent No.: US 8,124,291 B2
(45) Date of Patent: *Feb. 28, 2012

(54) FUEL CELL SYSTEM AND CONTROL METHOD THEREOF

(75) Inventors: Ryosuke Yagi, Yokohama (JP); Takahiro Suzuki, Tokyo (JP); Yuusuke Sato, Tokyo (JP); Eiichi Sakaue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 908 days.

This patent is subject to a terminal disclaimer.

(21) Appl. No.: 12/137,264

(22) Filed: Jun. 11, 2008

(65) Prior Publication Data

US 2009/0011300 A1 Jan. 8, 2009

(30) Foreign Application Priority Data

Jun. 12, 2007 (JP) ................................. 2007-155615

(51) Int. Cl.
*H01M 8/04* (2006.01)
(52) U.S. Cl. ....................................... 429/442; 429/449
(58) Field of Classification Search .................. 429/433, 429/439, 442, 448, 449
See application file for complete search history.

(56) References Cited

U.S. PATENT DOCUMENTS

| | | | | |
|---|---|---|---|---|
| 6,913,847 B2 * | 7/2005 | Wells et al. | .................... | 429/439 |
| 7,201,981 B2 * | 4/2007 | Enjoji et al. | .............. | 429/442 X |
| 2002/0119352 A1 * | 8/2002 | Baldauf et al. | .................... | 429/13 |
| 2008/0057364 A1 * | 3/2008 | Yamaguchi | ..................... | 429/23 |
| 2008/0166607 A1 * | 7/2008 | Muramatsu et al. | ............ | 429/22 |
| 2010/0255395 A1 * | 10/2010 | Yagi et al. | ..................... | 429/442 |

FOREIGN PATENT DOCUMENTS

| | | |
|---|---|---|
| JP | 5-258760 | 10/1993 |
| JP | 2005-11633 | 1/2005 |
| JP | 2005-32610 | 2/2005 |
| JP | 2005-108713 | 4/2005 |

OTHER PUBLICATIONS

U.S. Appl. No. 11/531,582, filed Sep. 13, 2006, Ryosuke Yagi et al.
U.S. Appl. No. 12/204,055, filed Sep. 4, 2008, Suzuki et al.

* cited by examiner

*Primary Examiner* — Stephen J. Kalafut
(74) *Attorney, Agent, or Firm* — Oblon, Spivak, McClelland, Maier & Neustadt, L.L.P.

(57) ABSTRACT

In a fuel cell system, mixture fuel having a certain fuel concentration is supplied to an anode, electric power is output from between the anode and the cathode due to electrochemical reaction when the cathode makes contact with air, and unreacted fuel containing unreacted fuel is discharged from the anode. A fuel circulating path for circulating the unreacted fuel to the anode is connected to the power generating unit and fuel is supplied from the fuel supplying unit to the fuel circulating path depending on a reduction in pressure of the mixture fuel. The temperature of the power generating unit is controlled according to the concentration of the mixture fuel supplied to the anode. Consequently, a fuel cell system, which can achieve reduction of the size thereof without dropping fuel usage efficiency, can be provided.

26 Claims, 20 Drawing Sheets

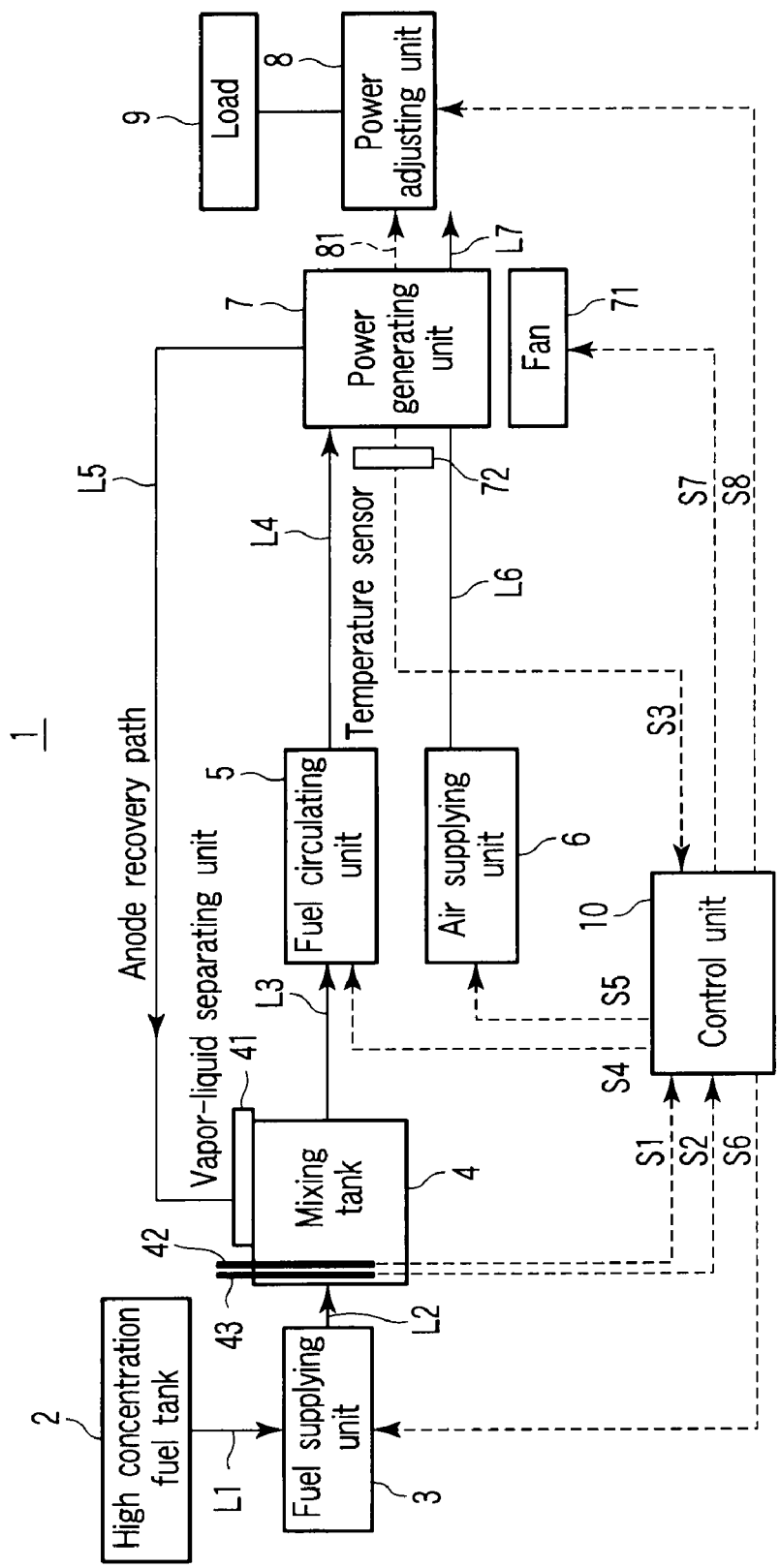
F I G. 1

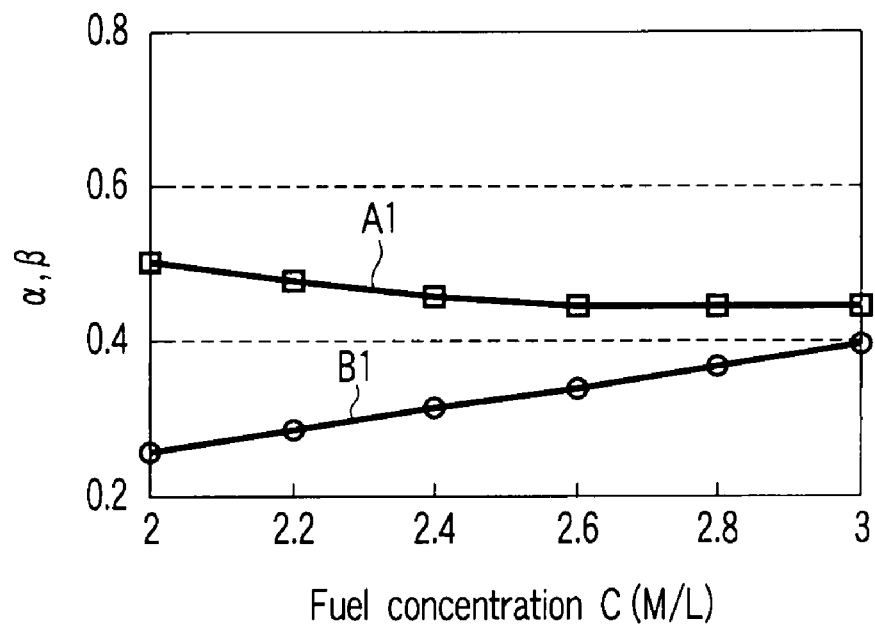
F I G. 2
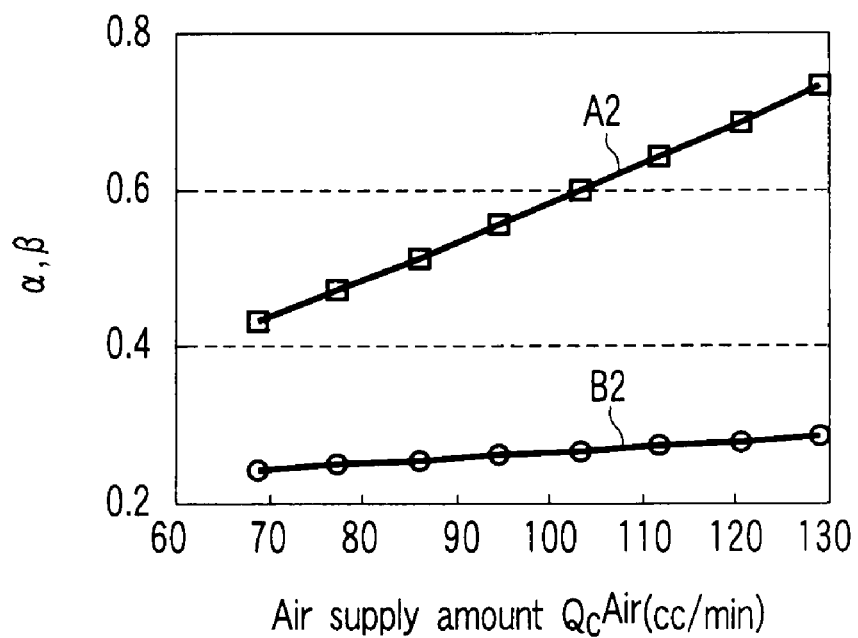
F I G. 3

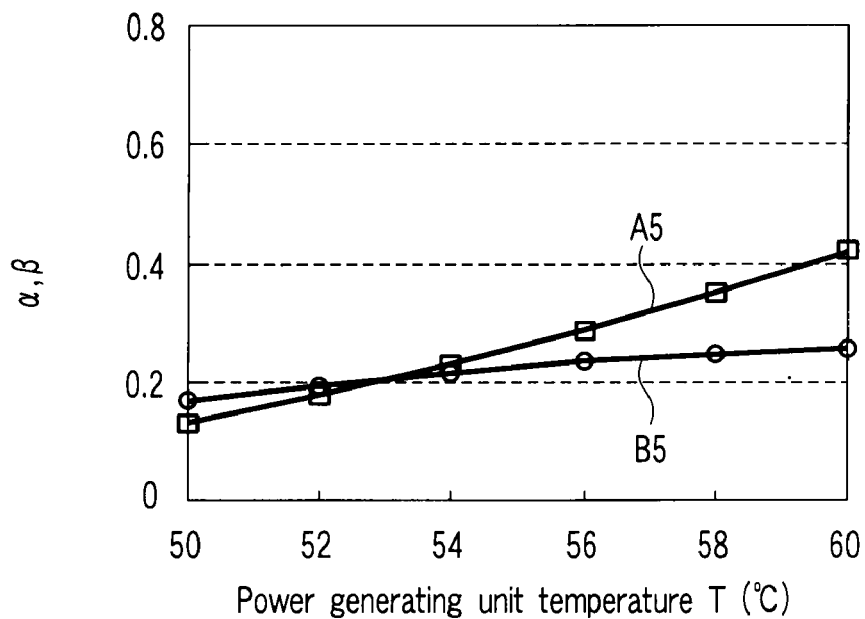
F I G. 6
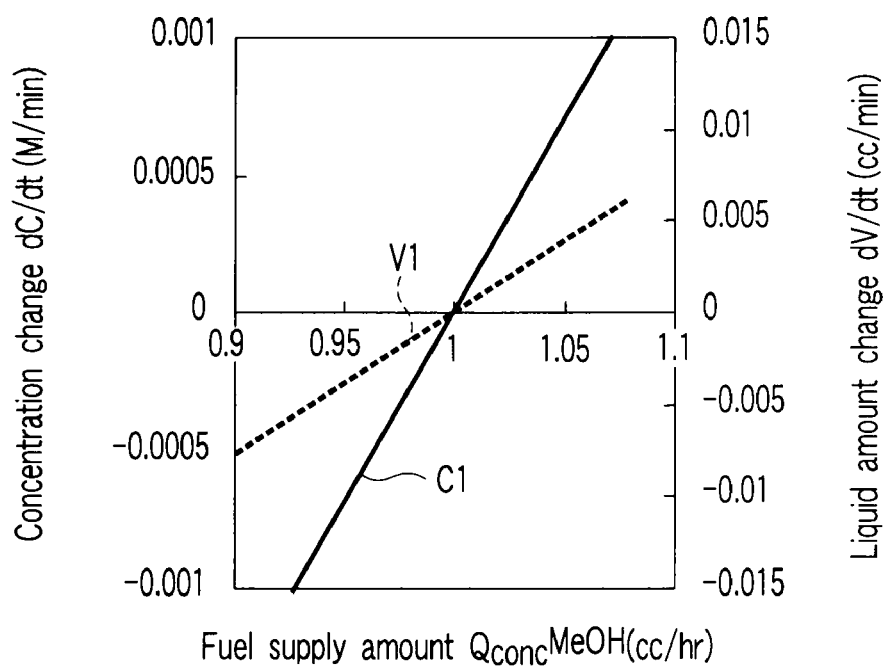
F I G. 7

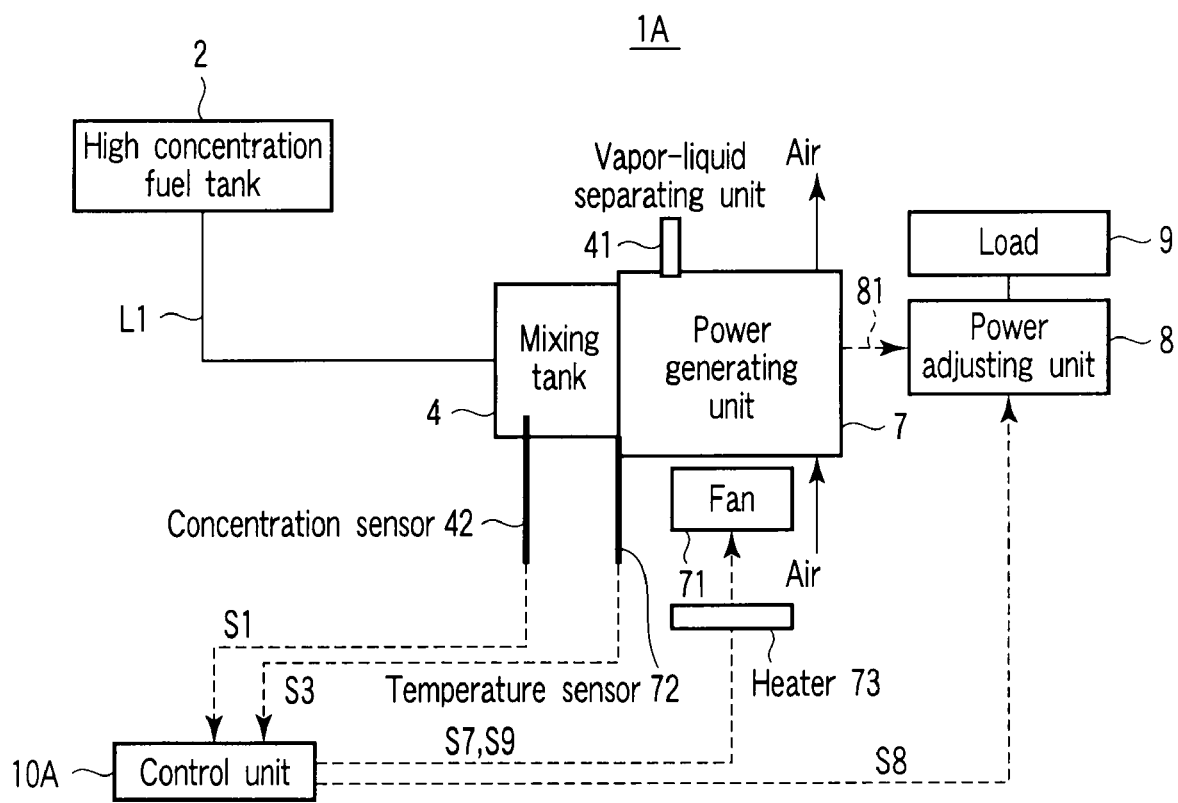
F I G. 16

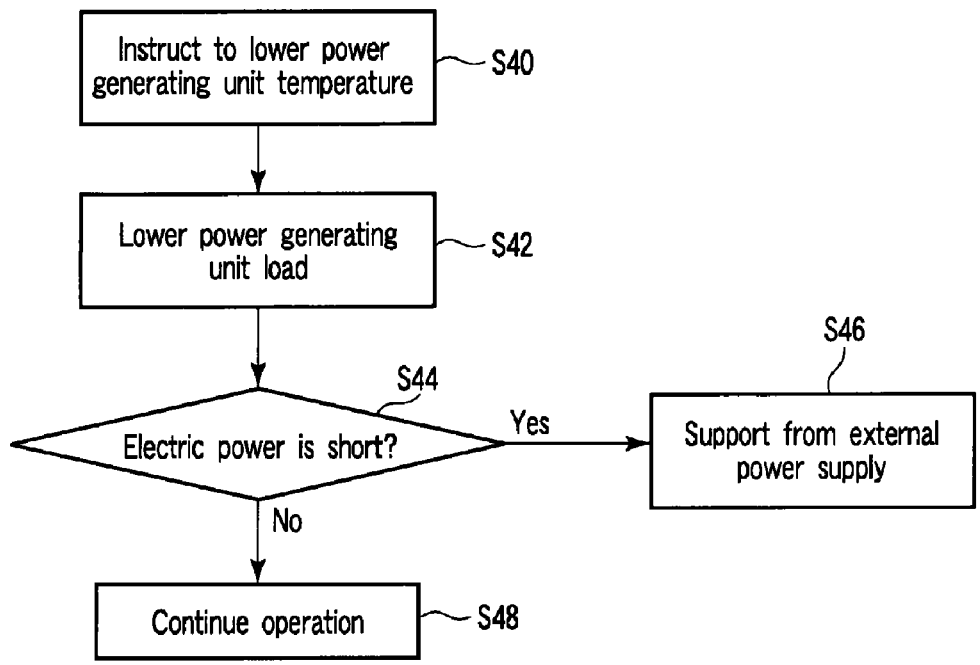
F I G. 21
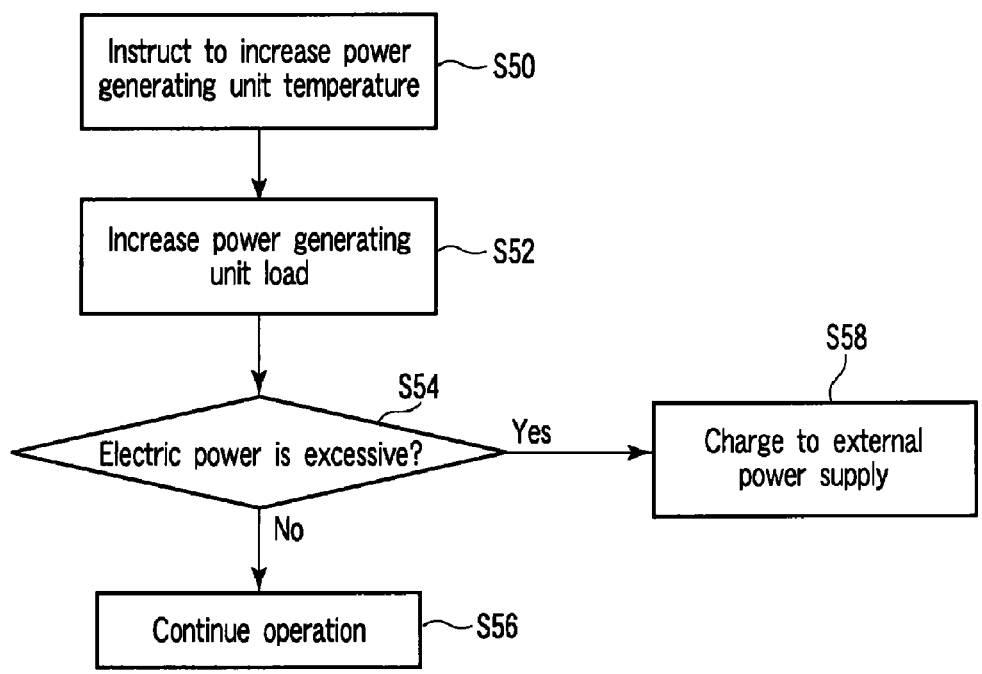
F I G. 22

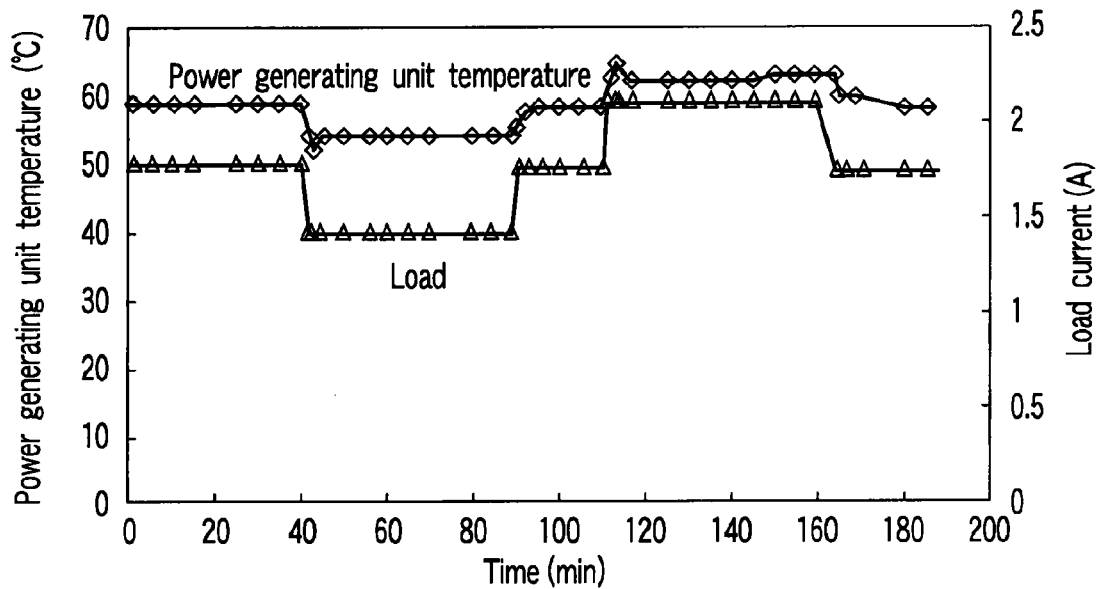
F I G. 23
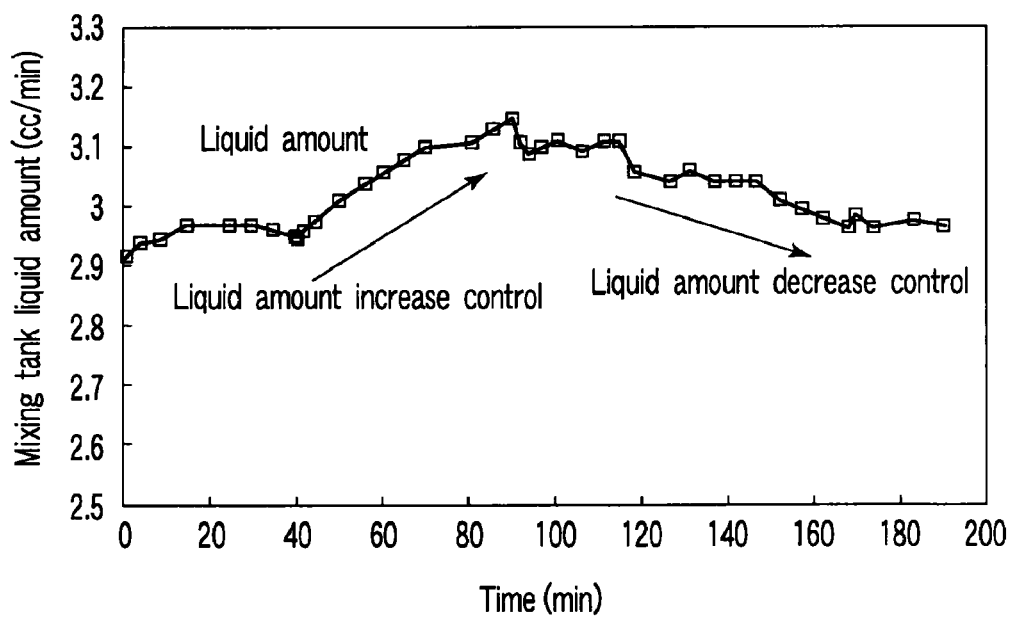
F I G. 24

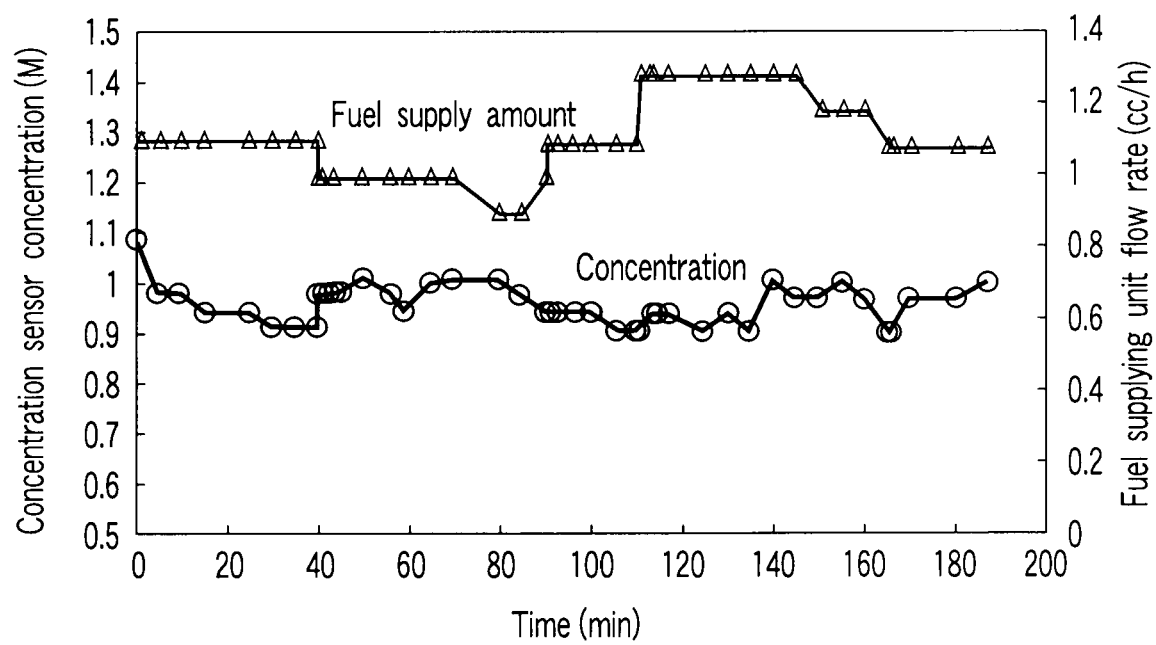
F I G. 25

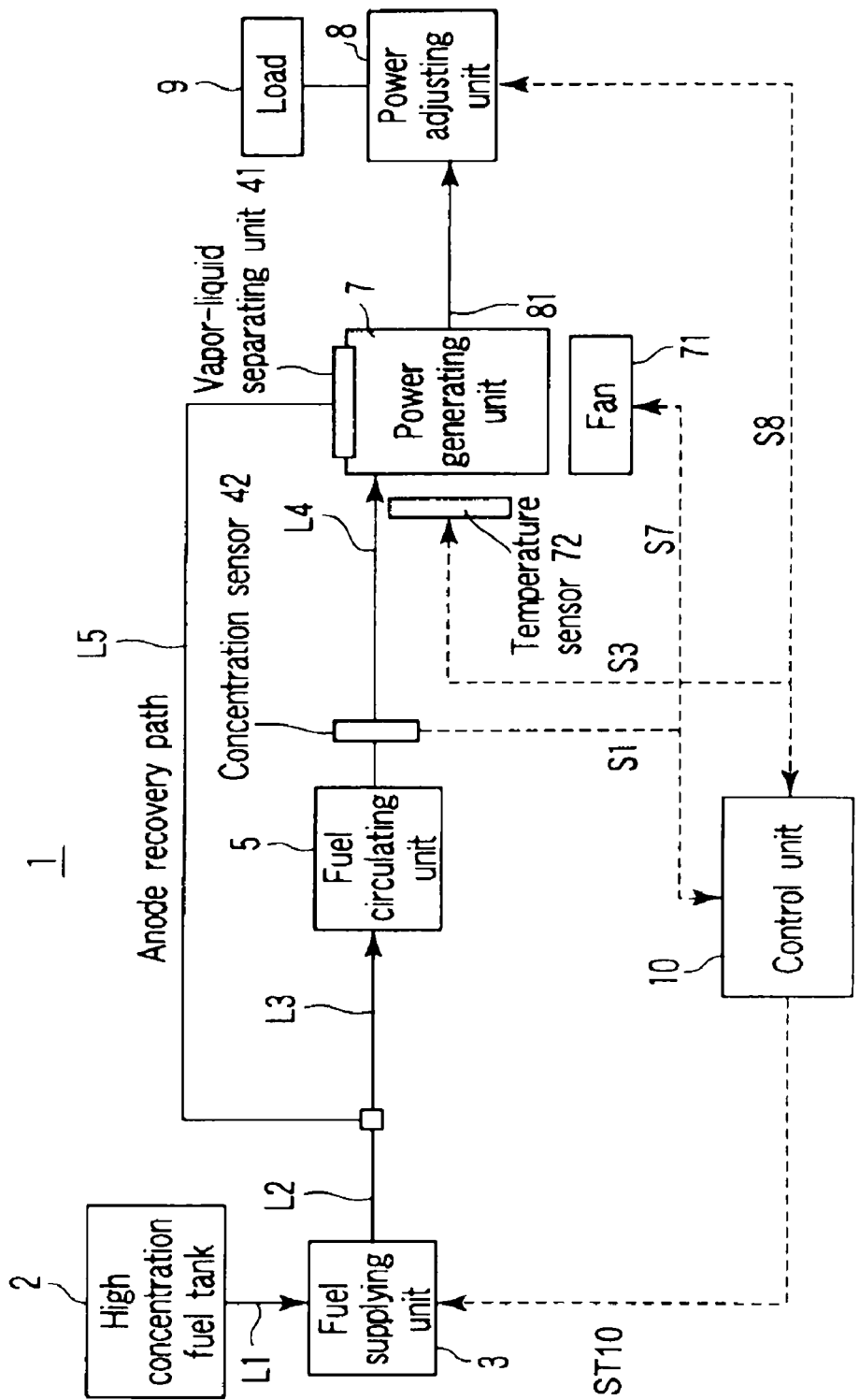
F I G. 26

Power generating unit output voltage

FUEL CELL SYSTEM AND CONTROL METHOD THEREOF

CROSS-REFERENCE TO RELATED APPLICATIONS

This application is based upon and claims the benefit of priority from prior Japanese Patent Application No. 2007-155615, filed Jun. 12, 2007, the entire contents of which are incorporated herein by reference.

BACKGROUND OF THE INVENTION

1. Field of the Invention

The present invention relates to a relatively small size fuel cell system for use in a portable appliance and a control method thereof.

2. Description of the Related Art

A direct methanol fuel cell (DMFC) has been developed progressively as a small power supply for a portable appliance from viewpoints that such an auxiliary device as a carburetor and a humidifier is not required, methanol is easier to handle than gas fuel such as hydrogen, and that it can be operated under low temperatures.

The DMFC has an electrode (MEA), anode electrode and cathode electrode, and there exist an active type in which the auxiliary device is used to supply fuel to the anode electrode and cathode electrode and a passive type in which natural power is used for that purpose. Although the former active type DMFC can raise the output density of the cell, such an auxiliary device as a pump for supplying fuel to the anode electrode and the cathode electrode is indispensable.

The DMFC needs methanol and water of the same mol for electrode reaction of the anode electrode. When high concentration methanol is supplied directly to the electrode, methanol crossover increases thereby dropping fuel usage efficiency. Then, to recover water generated by cathode electrode reaction efficiently and mix the recovered water with high concentration methanol within a mixing tank, a water recovery mechanism can be provided on the cathode electrode side as an auxiliary device. To block the volume of the apparatus from being increased due to installation of the water recovery mechanism on the cathode electrode side, it is possible to construct a system which circulates only fuel on the anode side without recovery of water on the cathode side.

In such a circulation type fuel cell system, it is important to maintain the concentration of fuel to be supplied to the anode electrode appropriately and maintain the amount of fuel within the mixing tank which feeds the fuel to the anode electrode appropriately. As the system for controlling the concentration and amount of fuel, various proposals have been made conventionally. For example, JP-A 2005-32610 (KOKAI) has proposed a system for controlling the concentration of mixed liquid by controlling the flow rate of fuel from the high concentration fuel tank and a cathode water recovery unit. Further, JP-A 2005-11633 (KOKAI) has proposed a system for controlling the concentration of mixed liquid by controlling the supply amount of fuel from the high concentration fuel tank and the water recovery amount on the cathode side. JP-A PH5-258760 (KOKAI) has proposed a system for controlling the amount and concentration of the mixed liquid by controlling the supply amount of fuel from the high concentration fuel tank and the supply amount of water from a water tank. JP-A 2005-108713 (KOKAI) has proposed a system which feeds air discharged from the cathode electrode to a condensation unit and operates a condensation fan and water recovery unit to change the amount of water to be supplied to a mixing tank, thereby controlling the concentration and amount of the mixed liquid.

The conventional fuel cell system includes a water recovery unit on the cathode side, a fuel supplying unit on the anode side, a water recovery circulation path which connects the cathode side with the anode side, and a water tank for supplying water from outside in order to control the concentration and amount of fuel in the mixing tank. These auxiliary devices occupy a large volume thereby increasing the size of the apparatus. Such a conventional system is too large to be used for the power supply for a portable small appliance such as a mobile phone, portable audio unit, and notebook personal computer.

On the other hand, if the water tank and water recovery circulation path are removed to decrease the size of the fuel cell system, the fuel usage efficiency drops.

BRIEF SUMMARY OF THE INVENTION

According to the invention, there is provided a fuel cell system comprising:

a power generating unit which generates an electric power and includes an anode, a cathode and an electrolyte membrane provided between the anode and the cathode, wherein mixture fuel having a fuel concentration is supplied to the anode, the cathode is made into contact with air, the electric power is output from between the anode and the cathode by electrochemical reaction, and unreacted fuel is discharged from the anode;

a fuel circulating path which circulates the unreacted fuel from the power generating unit to the anode;

a fuel supplying unit which supplies high concentration fuel to the fuel circulating path so as to add the high concentration fuel to the unreacted fuel to produce the mixture fuel, the high concentration fuel being supplied depending on a reduction of pressure of the mixture fuel;

a fuel circulating unit which circulates the mixture fuel in the anode; and a control unit which controls the temperature of the power generating unit according to the fuel concentration of the mixture fuel supplied to the anode.

According to the invention, there is further provided a fuel cell system comprising:

a power generating unit which generates an electric power and includes an anode, a cathode and an electrolyte membrane provided between the anode and the cathode, wherein mixture fuel having a fuel concentration is supplied to the anode, the cathode is made into contact with air, the electric power is output from between the anode and the cathode by electrochemical reaction, and unreacted fuel is discharged from the anode;

a fuel supplying unit which supplies high concentration fuel;

a tank which is provided in a fuel circulating path for circulating unreacted fuel from the power generating unit to the anode and stores the mixture fuel obtained by mixing the high concentration fuel supplied from the fuel supplying unit with the unreacted fuel;

a fuel circulating unit which circulates the mixture fuel from the tank to the anode; and a control unit which controls the temperature of the power generating unit according to an amount of the mixture fuel in the tank.

BRIEF DESCRIPTION OF THE SEVERAL VIEWS OF THE DRAWING

FIG. 1 is a configuration block diagram showing a fuel cell system according to an embodiment of the present invention;

FIG. 2 is a characteristic diagram showing the relationship between concentration C of mixed liquid fuel and α, β;

FIG. 3 is a characteristic diagram showing the relationship between air supply amount $Qc^{Air}$ and α, β;

FIG. 6 is a characteristic diagram showing the relationship between a power generator temperature T and amounts α, β;

FIG. 7 is a characteristic diagram showing the relationship among a fuel supply amount $Qconc^{MeOH}$, concentration change ΔC and liquid amount change ΔV;

FIG. 16 is a configuration block diagram showing a fuel cell system according to another embodiment of the present invention;

FIG. 21 is a flow chart showing processing accompanied by reduction of the amount of fuel in the fuel cell system shown in FIG. 18;

FIG. 22 is a flow chart showing processing accompanied by increase of the amount of fuel in the fuel cell system shown in FIG. 18;

FIG. 23 is a graph showing the relation between changes in load of the power generating unit and changes in temperature of the power generating unit in the fuel cell system shown in FIG. 18 in the processing shown in FIGS. 21 and 22;

FIG. 24 is a graph showing that increase/decrease in the amount of fuel is controlled according to changes in the power generating unit temperature as shown in FIG. 23 in the fuel cell system shown in FIG. 18;

FIG. 25 is a graph showing the relation between supply amount and concentration of fuel in the fuel cell system shown in FIG. 18;

FIG. 26 is a block diagram showing the fuel cell system according to further another embodiment in which the fuel cell system shown in FIG. 1 is modified;

DETAILED DESCRIPTION OF THE INVENTION

Figure 4:
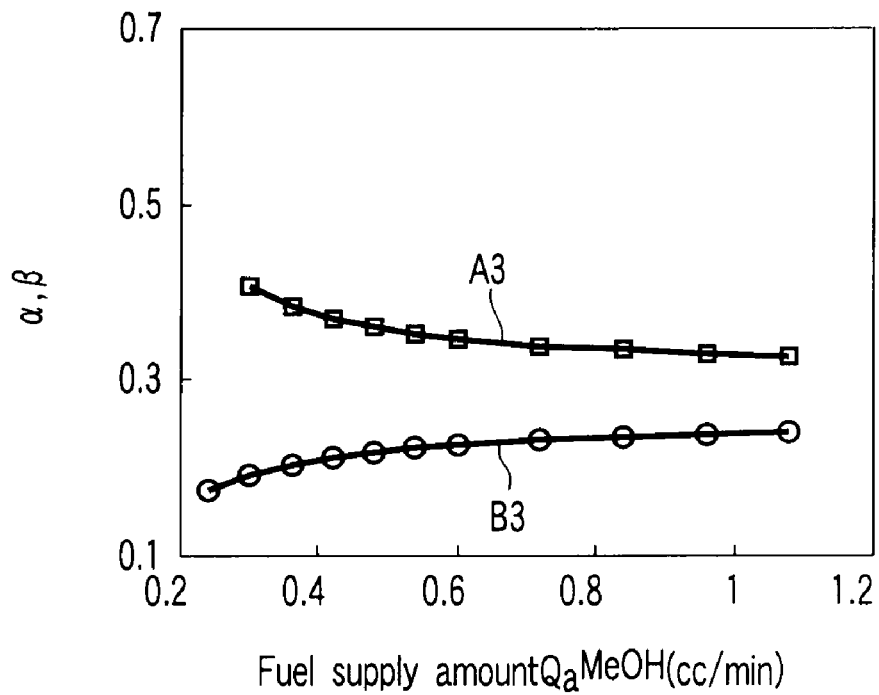
FIG. 4 is a characteristic diagram showing the relationship between fuel supply amount $Qa^{MeOH}$ and α, β.

Hereinafter, the best mode for carrying out the present invention will be described with reference to the accompanying drawings.

First Embodiment

As shown in FIG. 1, a fuel cell system 1 according to a first embodiment of the present invention includes a power generating unit 7 and auxiliary devices required for power generation. As major auxiliary devices, the system includes a high concentration fuel tank 2, a fuel supplying unit 3, a mixing tank 4, a fuel circulating unit 5, an air supplying unit 6, a power adjusting unit 8 and a Control unit 10 and as supplementary auxiliary devices, a concentration sensor 42, a liquid amount sensor 43, a fan 71 and a temperature sensor 72.

These auxiliary devices are connected directly or indirectly to the power generating unit 7 by plural lines L1 to L7, and fluid (liquid, gas or mixture of liquid and gas) is supplied to and discharged out of the power generating unit 7 through the lines L1 to L7 by using natural force and/or mechanical force. A system for transporting fluid using mainly natural force (for example, capillary force) is called "passive type fuel cell system" and a system for transporting fluid using mainly mechanical force (for example, pump feeding force) is called "active type fuel cell system".

The entire fuel cell system 1 is controlled totally by the control unit 10. The control unit 10 is connected to the power generating unit 7 and the auxiliary devices through a signal line, so that various kinds of signals S1 to S8 are exchanged among the control unit 10, the power generating unit 7 and the auxiliary devices. For example, the concentration sensor 42 detects the concentration of mixed liquid fuel (for example, methanol solution) in the mixing tank 4 and sends a detection signal S1 to the control unit 10. The liquid amount sensor 43 detects the amount of the mixed liquid fuel in the mixing tank 4 and sends a detection signal S2 to the control unit 10. Further, the temperature sensor 72 detects a temperature of the power generating unit 7 and sends a detection signal S3 to the control unit 10.

Figure 13:
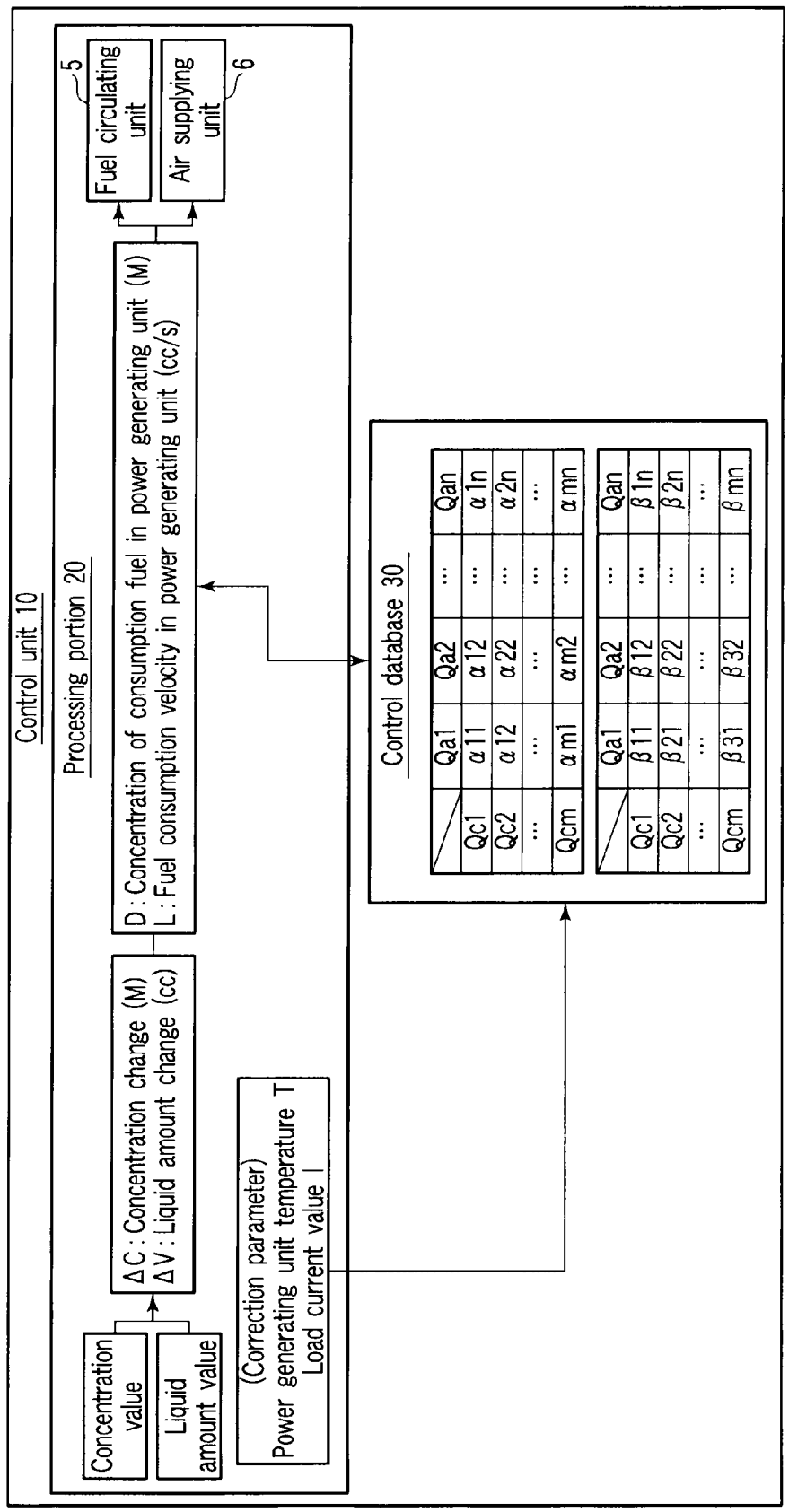
FIG. 13 is a control block diagram of the fuel cell system shown in FIG. 1.

As shown in FIG. 13, the control unit 10 obtains various kinds of control amounts based on these detection signals S1, S2, S3 and process data of a database 30, obtains various kinds of operation amounts based on the obtained control amounts and the various kinds of parameter values of a processing unit 20, and outputs operation signals S4 to S8 to one or two of the fuel circulating unit 5, the fuel supplying unit 3, the air supplying unit 6, the power adjusting unit 8 and the fan 71 of the power generating unit 7. For example, if the operation signal S8 is output from the control unit 10 to the power adjusting unit 8, a load current I applied to a load 9 is adjusted to a desired value. In the meantime, process data of the database 30 is obtained by performing a verification test preliminarily and refers to, for example, correlation data between parameters α, β and respective operation amounts. The processing unit 20 outputs the operation signals S4 to S8 based on information inputted from the concentration sensor 42, the liquid amount sensor 43, the temperature sensor 72 and the like and the process data of the database 30, and for example, outputs an operation signal based on data such as concentration control parameter and liquid amount control parameter and equations.

The power generating unit 7 includes laminated anode electrode, catalytic layer, electrolytic membrane, catalytic layer, cathode electrode (membrane-electrode assembly (MEA)), anode electrode channel plate and cathode electrode channel plate, so as to convert chemical energy of fuel to electric energy to generate power. The structure of the MEA is achieved by mounting a gas dispersion layer for discharging carbon dioxide and water generated by reaction from the catalytic layer and collecting reacting electrons smoothly, the gas dispersion layer being composed by coating both faces thereof with catalytic particles, with electrolyte membrane composed of proton-conductive solid polymer membrane sandwiched thereby while methanol and air being supplied to the catalytic layer.

An intake of the anode electrode channel plate is connected to line L4 and its exit is connected to line L5. An intake of the cathode electrode channel plate is connected to line L6 and its exit is connected to line L7 for discharging carbon dioxide which is a by-product out of the system.

The power generating unit 7 further includes a fan 71 and a temperature sensor 72. The fan 71 is used as temperature adjusting means for cooling the power generating unit 7 by blowing air to the power generating unit 7. In the meantime, as the temperature adjusting means, a Peltiert device or a water-cooling jacket as well as the fan 71 may be used. The temperature adjusting means may contain a heater for heating the power generating unit 7 as well as means for cooling the power generating unit 7. The temperature sensor 72 detects a temperature of the power generating unit 7 and sends a temperature detection signal S3 to the control unit 10. As the temperature sensor 72, thermo couple provided on the surface of the power generating unit 7 or within the power generating unit 7 may be used.

Liquid is used as fuel to be supplied to the anode electrode. Hereinafter, as an example of fuel, methanol aqueous solution is considered. The high concentration fuel tank 2 stores raw fuel, for example, methanol solution having a purity of 99.9% or more or high concentration fuel containing a small amount of water, for example, mixed solution of methanol and water, having a concentration of 10 mol/L (hereinafter referred to as M). In the meantime, the high concentration fuel tank 2 can be supplied with raw fuel or high concentration fuel from a supply port (not shown).

The fuel supplying unit 3 incorporates a pump whose operation is controlled by the control unit 10 and is connected to the high concentration fuel tank 2 through line L1 while connected to the mixing tank 4 through line L2. When the control unit 10 drives a pump of the fuel supplying unit 3, raw fuel or high concentration fuel is supplied from the high concentration fuel tank 2 into the mixing tank 4. The fuel supplying unit 3 can use a system which can supply fuel at a predetermined flow rate without requiring a drive power as well as a small electromagnetic pump like the fuel circulating unit 5. As this system, a method using a difference of water head between the fuel tank 2 and the mixing tank 4 or a method using capillary force by porous material can be considered.

Line L5 is a fuel circulating return path provided in an interval from the power generating unit 7 to the mixing tank 4. This line L5 functions as an anode recovery path for recovering remaining mixed solution (mixed solution of unreacted fuel not consumed by the anode electrode and water) not consumed on the anode electrode of the power generating unit 7 and carbon dioxide, that is, emission discharged from the anode electrode.

The mixing tank 4 communicates with the fuel supplying unit 3 through line L2 while communicating with the anode side of the power generating unit 7 through line L5. In the mixing tank 4, raw fuel or high concentration fuel from the high concentration fuel tank 2 and mixed solution recovered from the anode electrode of the power generating unit 7 are mixed. In the meantime, the mixing tank 4 has stored therein diluted methanol aqueous solution (mixed liquid fuel) having an initial concentration of from 1.5M to 2.5M.

A vapor-liquid separating unit 41 is attached to a connection unit between the mixing tank 4 and the line L5. The vapor-liquid separating unit 41 has a vapor-liquid separation film for separating gas containing carbon dioxide from the mixed solution.

The mixing tank 4 includes detection means for obtaining information on the concentration and amount of the mixed liquid fuel. The concentration sensor 42 can be used as means for detecting the concentration of the mixed liquid fuel. The concentration sensor 42 is attached within the mixing tank 4 or to appropriate positions of the lines L3, L4 as shown in FIG. 1. However, the concentration sensor 42 is an arbitrary component in the system of this embodiment. This is because the concentration of the mixed liquid fuel can be detected by software instead of the concentration sensor (hardware). That is, the control unit 10 can be provided with a computer program for estimating the concentration of the mixed liquid fuel based on information about output and temperature of the power generating unit 7. In the meantime, as the concentration sensor 42, for example, an ultrasonic type or near-infrared multiple-wavelength type sensor may be used.

As means for detecting the amount of the mixed liquid fuel, the liquid amount sensor 43 may be used. As shown in FIG. 1, the liquid amount sensor 43 is mounted within the interior of the mixing tank 4 in order to detect the level of the mixed liquid fuel in the tank 4. Instead of the liquid amount sensor (liquid level gauge) 43, means for measuring the weight of the mixing tank 4 (for example, load cell) may be used.

The fuel circulating unit 5 circulates the mixed liquid fuel in a loop path constituted of the lines L3, L4, L5 containing the power generating unit 7 and the mixing tank 4. The fuel circulating unit 5 incorporates a pump whose operation is controlled by the control unit 10, and is connected to the mixing tank 4 through the line L3 while connected to the anode side of the power generating unit 7 through the line L4. As the fuel circulating unit 5, a small electromagnetic pump is preferred to be used from requirements for a small size, a small power consumption and that the supply flow rate can be controlled from outside.

The air supplying unit 6 incorporates an air pump or a fan which is controlled by the control unit 10 and is connected to the cathode side of the power generating unit 7 through the line L6 so as to supply air to the cathode electrode of the power generating unit 7. As the air supplying unit 6, it is preferable to use a small pneumatic pump or a fan because its power consumption is small and the supply flow rate can be controlled from outside.

The power adjusting unit 8 is provided between the power generating unit 7 and the load 9 in order to fetch out an output form the power generating unit 7 to the load 9 smoothly. A circuit of the power adjusting unit 8 is connected to the output side of the control unit 10 so as to control the load current I applied to the load 9. In the meantime, electric power generated by the power generating unit 7 is output to the power adjusting unit 8 through a lead line 81.

A methanol consumption amount per unit time and unit area of the anode electrode when the direct methanol fuel cell generates electric power is expressed by the amount of methanol for use in reaction and the amount of methanol crossover which moves from the anode side passing through the electrolyte membrane. More specifically, the consumption amount $J^{CONS}_{CH3OH}$ of methanol at the anode electrode is given by the following equation (1).

$$J^{cons}_{CH3OH} = \frac{I}{6F}(1+\beta) \quad (1)$$

where I is a load current (A), F is a Faraday constant, and $\beta$ is a ratio of the moving amount of methanol which moves for crossover with respect to the amount of methanol used in reaction at the time of power generation.

Likewise, the amount of consumption of water on the anode side is expressed by the amount of water for use in reaction and the crossover amount of water which moves to the cathode side and the anode side passing through electrolyte membrane. More specifically, the consumption amount $J^{CONS}_{H2O}$ of water on the anode electrode is given by the following equation (2).

$$J^{cons}_{H2O} = \frac{I}{6F}(1+6\alpha) \quad (2)$$

where $\alpha$ is a ratio of the traveling amount of water molecule to the traveling amount of a proton generated by reaction. Therefore, the consumption amount of methanol at the anode electrode is proportional to the methanol crossover amount and the load current I and the consumption amount of water is proportional to the crossover amount of water and the load current I likewise. Then, if the consumption amounts of methanol and water are adjusted by changing the load current I, the crossover amount of methanol and the crossover amount of water, the amounts of methanol and water in the mixed solution which circulates in the lines L3, L4, L5 can be controlled. The feature of the present embodiment exists in that the amounts of methanol and water are controlled by changing the crossover amounts of methanol and water without changing the output largely.

[Correlation Between the Concentration C of the Mixed Liquid Fuel and $\alpha$, $\beta$]

An experiment was made under a condition that the load current I was 1.8 A and the air supply amount $Qc^{Air}$ was 87 cc/min. The result is shown in FIG. 2. A characteristic line A1 (white squares plotted) in FIG. 2 indicates the relation between the concentration C of mixed liquid fuel supplied to the anode electrode and $\alpha$ and a characteristic line B1 (white circles plotted) indicates the relation between the concentration C of the mixed liquid fuel and $\beta$. This concentration C can be detected by the concentration sensor 42. A result that $\beta$ increased as the concentration C of the mixed liquid fuel rose was obtained, and an inclination that $\alpha$ decreased as the concentration C of the mixed liquid fuel rose was obtained. Further, it was confirmed that the change amount of $\alpha$ with respect to $\beta$ was relatively small.

[Correlation Between Air Supply Amount $Qc^{Air}$ and $\alpha$, $\beta$]

An experiment was made using mixed liquid fuel having a concentration of 2M under a condition that the load current I was 1.8 A. The result is shown in FIG. 3. A characteristic line A2 (white squares plotted) in FIG. 3 indicates the relation between the air supply amount $Qc^{Air}$ and $\alpha$ and a characteristic line B2 (white circles plotted) indicates the relation between the air supply amount $Qc^{Air}$ and $\beta$. If the air supply amount $Qc^{Air}$ increased, the amount of water which could be contained in air increased, so that more water generated at the cathode electrode could be contained in supplied air, whereby moisture of the gas dispersion layer dropped and $\alpha$ increased monotonously.

On the other hand, although $\beta$ is apparently inclined to increase as the air supply amount $Qc^{Air}$ increases, it is quite small as compared to the change amount of $\alpha$. If both parameters $\alpha$, $\beta$ are adjusted by changing the moisture of the gas dispersion layer by operating the air supply amount $Qc^{Air}$ to the cathode electrode, the consumption amount of methanol and the consumption amount of water in the line L5 can be changed. Here, it is assumed that to secure an output of the power generating unit 7, the air supply amount $Qc^{Air}$ is supplied more than an air supply amount necessary for power generation and the air supplying unit 6 is operated so that it is in a range which satisfies the relation of the following equation (3).

$$24451 \frac{I}{0.84F} < Q^{Air}_C \quad (3)$$

(cc/s)

where I is load current (A) and F is Fraday constant.

[Correlation Between Fuel Supply Amount $Qa^{MeOH}$ and $\alpha$, $\beta$]

An experiment was made using mixed liquid fuel having a concentration of 2M with an air supply amount $Qc^{Air}$ of 87 cc/min under a condition that the load current was 1.8 A. FIG. 4 shows its result. A characteristic line A3 (white squares plotted) in FIG. 4 indicates changes in $\alpha$ with respect to the fuel supply amount $Qa^{MeOH}$ and a characteristic line B3 (white circles plotted) indicates changes in $\beta$ with respect to the fuel supply amount $Qa^{MeOH}$. It was made evident that if the mixed liquid fuel to be supplied was increased with respect to the fuel supply amount $Qa^{MeOH}$ necessary for generation of power, $\beta$ was increased, thereby decreasing $\alpha$.

The mixed liquid fuel in the mixing tank 4 is fed into the power generating unit 7 by the fuel circulating unit 5 and sent to the anode electrode through the anode channel plate. Then, if the flow rate of fuel sent to the anode electrode is changed by operating the fuel circulating unit 5, changes in difference of concentration between the intake side and the exit side of the anode channel plate can be created by consumption of fuel and water by reaction of power generation. To create a large difference in concentration between the intake concentration and the exit concentration of the channel plate, as the anode channel, a serpentine channel is preferable to a parallel channel because the length of a path passing the electrode is large. This is because this serpentine channel produces a larger fuel concentration gradient (characteristic) in the electrode (MEA).

If in this channel, the flow rate of the mixed liquid fuel fed to the anode electrode is decreased by operating the fuel circulation unit 5, the concentration of fuel at the exit of the power generating unit 7 is dropped, so that $\beta$ is decreased while $\alpha$ is increased. Conversely, if the flow rate of the mixed liquid fuel sent to the anode electrode is increased, the concentration of fuel at the exit of the power generating unit 7 is increased, so that $\beta$ is increased while $\alpha$ is decreased.

If the fuel circulating unit 5 is operated to change the fuel supply amount $Qa^{MeOH}$, thereby providing a concentration gradient within the channel to adjust β and α, the consumption amount of methanol and consumption amount of water in line L5 can be controlled. The fuel supply amount $Qa^{MeOH}$ is controlled by the fuel circulating unit 5 to be in a range which satisfies the relation of the following equation (4).

$$\frac{I}{6F}\frac{1000}{C} < Q_a^{MeOH} < \frac{I}{6F}\frac{6000}{C} \quad (4)$$
(cc/s)

where I is a load current (A), F is Fraday constant, and C is concentration (M) of the mixed liquid fuel in the mixing tank. In the meantime, the fuel supply amount $Qa^{MeOH}$ shall be equal to or larger than the amount of fuel necessary for power generation reaction. While the crossover is increased, the area in which large change gradients of α, β can be obtained with respect to a change in the fuel supply amount $Qa^{MeOH}$ is preferred to be set in a changeable range of the fuel supply amount $Qa^{MeOH}$. Considering that the gradient of changes in α, β with respect to the changes in the fuel supply amount $Qa^{MeOH}$ uses an area in which the gradient is large, the fuel supply amount $Qa^{MeOH}$ is set to six times or less the fuel supply amount $Qa^{MeOH}$ necessary for consumption by power generation. This is because, even if fuel is supplied at a fuel supply amount exceeding six times the fuel supply amount $Qa^{MeOH}$ necessary for consumption by power generation, changes in α, β with respect to an increase in the fuel supply amount $Qa^{MeOH}$ are small, so that its effect is saturated. Further, there is a limitation in the fuel supply amount $Qa^{MeOH}$ of the fuel circulating unit 5.

[Correlation Between Load Current I and α, β]

Figure 5:
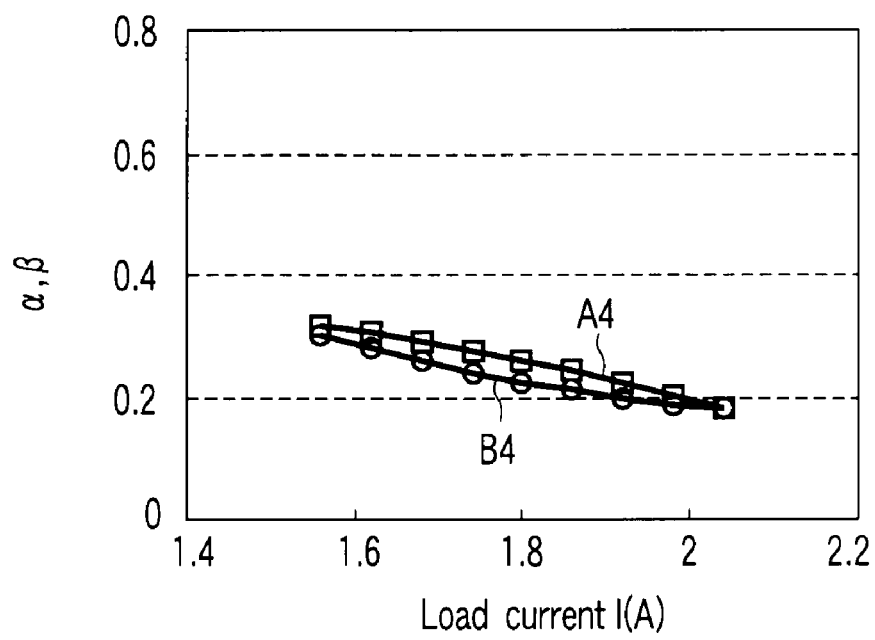
FIG. 5 is a characteristic diagram showing the relationship between a load current I and α, β.

An experiment was made under a condition that the concentration of mixed liquid fuel was 2M and the air supply amount $Qc^{Air}$ was 87 cc/min. FIG. 5 shows its result. A characteristic line A4 (white squares plotted) in FIG. 5 indicates a change in α with respect to the load current I and a characteristic line B4 (white circles plotted) indicates a change in β with respect to the load current I. It was made evident that if the load current I was increased, both α, β were decreased and if the load current I was decreased, both α, β were increased.

[Correlation Between Temperature of Power Generating Unit and α, β]

An experiment was made under a condition that the concentration of the mixed liquid fuel was 2M and the air supply amount $Qc^{Air}$ was 87 cc/min. FIG. 6 shows its result. A characteristic line A5 (white squares plotted) in FIG. 6 indicates a change in a with respect to the power generating unit temperature T(° C.) and a characteristic B5 (white circles plotted) indicates a change in β with respect to the power generating unit temperature T. It was made evident that if the power generating unit temperature T was increased, both α, β were increased and if the power generating unit temperature T was decreased, both α, β were decreased.

Next, the operation of the fuel cell system of this embodiment will be outlined.

Mixed liquid fuel is supplied from the fuel circulating unit 5 to the anode electrode of the power generating unit 7 and air is supplied from the air supplying unit 6 to the cathode electrode. When the system 1 is connected to the load 9 through the power adjusting unit 8, generation of power is started, so that methanol and water perform oxidation reaction in the anode electrode, and methanol and water are consumed by traveling by crossover.

Mixed solution and carbon dioxide (reacted product) not consumed by the power generating unit 7 are sent to the mixing tank 4 through the line L5. For carbon dioxide not to circulate through the line L5 again, carbon dioxide needs to be discharged out of the system. Then, the mixing tank 4 is provided with the vapor-liquid separating unit 41 and carbon dioxide is separated and removed from emission by the vapor-liquid separating unit 41. The vapor-liquid separating unit can use a marketed general purpose vapor-liquid separating film. If a vapor-liquid separating pipe is used in the vapor-liquid separating unit 41, its installation place is not limited to the interior of the mixing tank 4 but it may be mounted out of the mixing tank 4. The vapor-liquid separating unit 41 may be attached to, for example, the recovery line L5 (see FIG. 16). In the meantime, raw fuel or high concentration fuel equal to methanol and water flux, consumed by the power generating unit 7, is supplied from the high concentration fuel tank 2 to the mixing tank 4 at a predetermined flow rate.

The concentration and amount of the mixed liquid fuel within the mixing tank 4 are measured with the sensors 42, 43 and its measurement data is sent to the control unit 10. The Control unit 10 operates the fuel circulating unit 5 and the air supplying unit 6 so that the concentration and amount of the mixed liquid fuel within the mixing tank 4 are appropriate, based on the measurement data and predetermined process data.

Next, the correlation between a concentration change dC/dt and liquid amount change dV/dt, per unit time of the mixed liquid fuel within the mixing tank 4 and various parameters will be described with reference to FIGS. 7 to 11.

An experiment was made under a condition that the initial concentration of the mixed liquid fuel within the mixing tank 4 was 2.0M and the amount of liquid was 3.0 cc. Consequently, various correlation data described below were obtained.

[Correlation Between Fuel Supply Amount $Qconc^{MeOH}$ and dC/dt, dV/dt]

A characteristic line C1 in FIG. 7 indicates the relation between the fuel supply amount $Qconc^{MeOH}$(cc/hr) and a change in concentration per unit time dC/dt (M/min). Further, a characteristic line V1 indicates the relation between the fuel supply amount $Qconc^{MeOH}$ and a change in liquid amount dV/dt (cc/min) per unit time. The $Qconc^{MeoH}$ means a flow rate of the raw fuel or high concentration fuel supplied from the fuel supplying unit 3 into the mixing tank 4. At this time, the fuel circulating unit 5, the air supplying unit 6, the power adjusting unit 8, and the power generating unit 7 are operated under a predetermined temperature condition.

When the fuel supply amount $Qconc^{MeOH}$ is changed by operating the fuel supplying unit 3, if the fuel supply amount $Qconc^{MeOH}$ is increased, the concentration change per unit time dC/dt and the liquid amount change per unit time dV/dt are increased as shown in FIG. 7 (characteristic lines C1, V1). Thus, if both the concentration and the amount of the mixed liquid fuel are decreased as a result of detecting the concentration and amount of the mixed liquid fuel by the concentration sensor 42 and the liquid amount sensor 43, the fuel supply amount $Qconc^{MeOH}$ is raised. Conversely, if both the concentration and amount of the mixed liquid fuel are increased, the fuel supply amount $Qconc^{MeOH}$ is lowered. By operating the fuel supplying unit 3 in this manner, the concentration and amount of the mixed liquid fuel within the mixing tank 4 can be controlled to be in an appropriate range.

[Correlation Between Air Supply Amount $Qc^{Air}$ and dC/dt, dV/dt]

Figure 8:
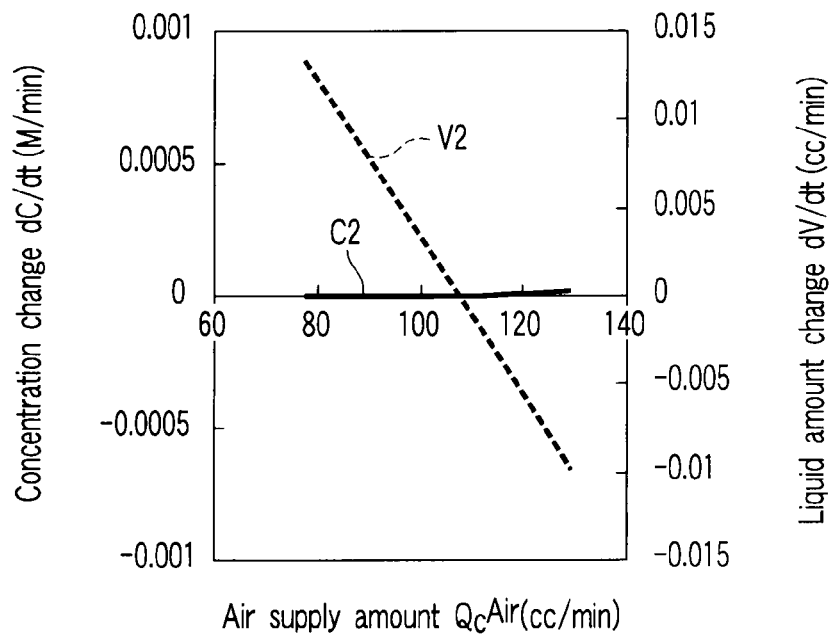
FIG. 8 is a characteristic diagram showing the relationship among the air supply amount $Qc^{Air}$, the concentration change ΔC and the liquid amount change ΔV.

A characteristic line C2 in FIG. 8 indicates the relation between the air supply amount $Qc^{Air}$(cc/min) and concentration change per unit time dC/dt. A characteristic line V2 indicates the relation between the air supply amount $Qc^{Air}$ and liquid amount change dV/dt per unit time. $Qc^{Air}$ means an amount of air supplied from the air supplying unit 6 to the cathode electrode of the power generating unit 7. At this time, the fuel supplying unit 3, the fuel circulating unit 5, the power adjusting unit 8 and the power generating unit 7 are operated under a predetermined temperature condition.

When the air supply amount $Qc^{Air}$ supplied to the power generating unit 7 is changed by operating the air supplying unit 6, although the concentration change per unit time dC/dt is changed little as shown in FIG. 8 (characteristic line C2), the liquid amount change per unit time dV/dt is changed largely (characteristic line V2). When the liquid amount sensor 43 detects that the amount of the mixed liquid fuel within the mixing tank 4 is decreased during an operation, the control unit 10 operates the air supplying unit 6 so as to lower the air supply amount $Qc^{Air}$. Conversely, when the liquid amount sensor 43 detects that the amount of the mixed liquid fuel within the mixing tank 4 has been increased, the air supply amount $Qc^{Air}$ is raised. When the liquid amount sensor 43 detects that the amount of the mixed liquid fuel within the mixing tank 4 reaches a normal level, the air supply amount $Qc^{Air}$ is returned to a flow rate at the time of regular operation. By operating the air supplying unit 6 in this way, the amount of the mixed liquid fuel within the mixing tank 4 can be controlled to an appropriate range.

If the air supply amount $Qc^{Air}$ is changed, the concentration is changed little with respect to a change in liquid amount. Thus, it is possible to construct a system for controlling the liquid amount by detecting the amount of the mixed liquid fuel without controlling the concentration of the mixed liquid fuel.

[Correlation Between Fuel Supply Amount $Qa^{MeOH}$ and dC/dt, dV/dt]

Figure 9:
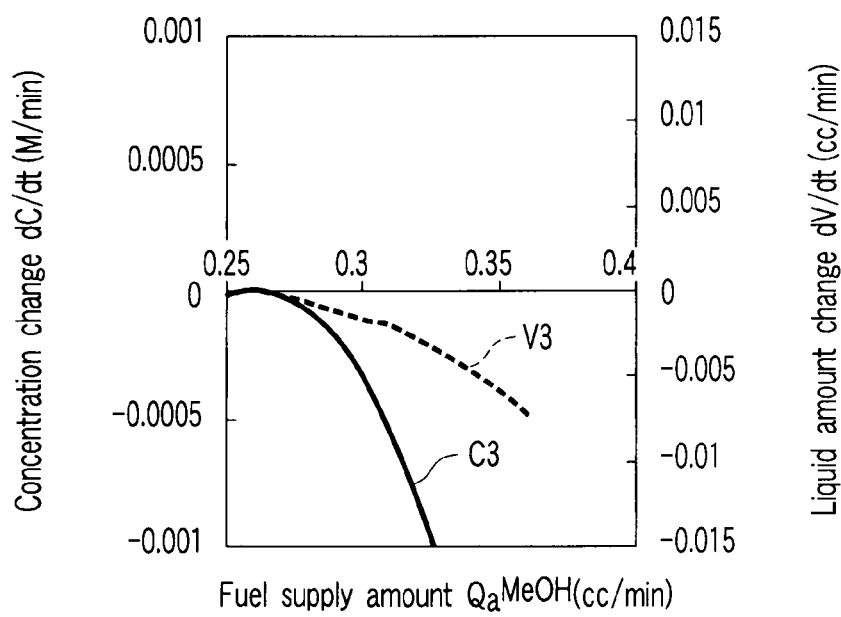
FIG. 9 is a characteristic diagram showing the relationship among a fuel supply amount $Qa^{MeOH}$, concentration change ΔC and liquid amount change ΔV.

A characteristic line C3 in FIG. 9 indicates the relation between the fuel supply amount $Qa^{MeOH}$ (cc/min) and the concentration change per unit time dC/dt. Further, a characteristic line V3 indicates the relation between the fuel supply amount $Qa^{MeOH}$ and liquid amount change per unit time dV/dt. The $Qa^{MeOH}$ means an amount of the mixed liquid fuel supplied from the fuel circulating unit 5 to the anode electrode of the power generating unit 7. At this time, the fuel supplying unit 3, the air supplying unit 6, the power adjusting unit 8 and the power generating unit 7 are operated under a predetermined temperature condition.

When the fuel flow rate $Qa^{MeOH}$ is changed by operating the fuel circulating unit 5, if the fuel supply amount $Qa^{MeOH}$ is increased, the concentration change per unit time dC/dt and the liquid amount change per unit time dV/dt are decreased (characteristic lines C3, V3). Thus, if the concentration and the amount of the mixed liquid fuel have been decreased as a result of detecting the concentration and amount of the mixed liquid fuel by the concentration sensor 42 and the liquid amount sensor 43, the fuel supply amount $Qa^{MeOH}$ is lowered. Conversely, if both the concentration and amount of the fuel have been increased, the fuel supply amount $Qa^{MeOH}$ is raised. By operating the fuel circulating unit 5 in this way, the concentration and amount of the mixed liquid fuel within the mixing tank 4 can be controlled to an appropriate range.

[Correlation Between Load Current I and dC/dt, dV/dt]

Figure 10:
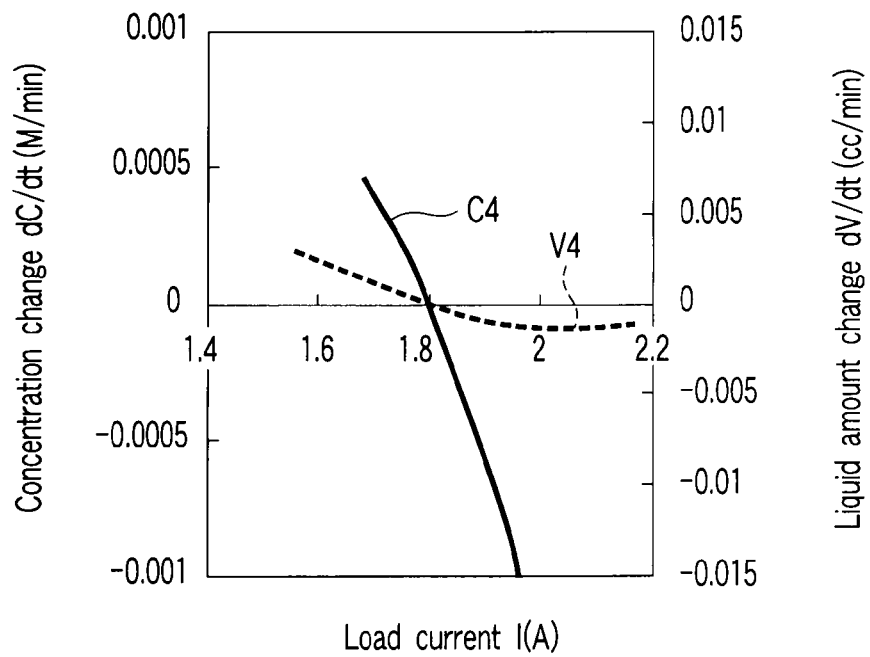
FIG. 10 is a characteristic diagram showing the relationship among a load current I, the concentration change ΔC and the liquid amount change ΔV.

A characteristic line C4 in FIG. 10 indicates the relation between the load current I and the concentration change per unit time dC/dt and a characteristic line V4 indicates the relation between the load current I and liquid amount change per unit time dV/dt. The load current I means a load current value which is fetched out from the power generating unit 7 to the load 9 by operating the power adjusting unit 8. At this time, the fuel supplying unit 3, the fuel circulating unit 5, the air supplying unit 6 and the power generating unit 7 are operated under a predetermined temperature condition.

When the load current I to be fetched out of the power generating unit 7 is changed by operating the power adjusting unit 8, if the load current I is increased, both the concentration change per unit time dC/dt and the liquid amount change per unit time dV/dt are decreased (characteristic lines C4, V4) as shown in FIG. 10. Thus, if the concentration and amount of the mixed liquid fuel are decreased as a result of detecting the concentration and amount of the mixed liquid fuel by means of the concentration sensor 42 and the liquid amount sensor 43, the load current I is lowered. Conversely, if both the concentration and amount of the mixed liquid fuel are increased, the load current I is raised. By operating the power adjusting unit 8 in this way, the concentration and amount of the mixed liquid fuel within the mixing tank 4 can be controlled to an appropriate range.

If a change rate between the concentration change per unit time dC/dt and liquid amount change per unit time dV/dt when the load current I is changed is compared with a change rate between the concentration change per unit time dC/dt and the liquid amount change per unit time dV/dt when the fuel supply amount $Qconc^{MeOH}$, air supply amount $Qc^{Air}$, fuel supply amount $Qa^{MeOH}$ and the load current I are changed, the concentration change per unit time dC/dt is larger than the rate of the liquid amount change per unit time dV/dt. Thus, it is possible to construct a system which detects the concentration of the mixed liquid fuel and controls the concentration without controlling the amount of the mixed liquid fuel by operating the power adjusting unit 8.

[Correlation Between Power Generating Unit Temperature T and dC/dt, dV/dt]

Figure 11:
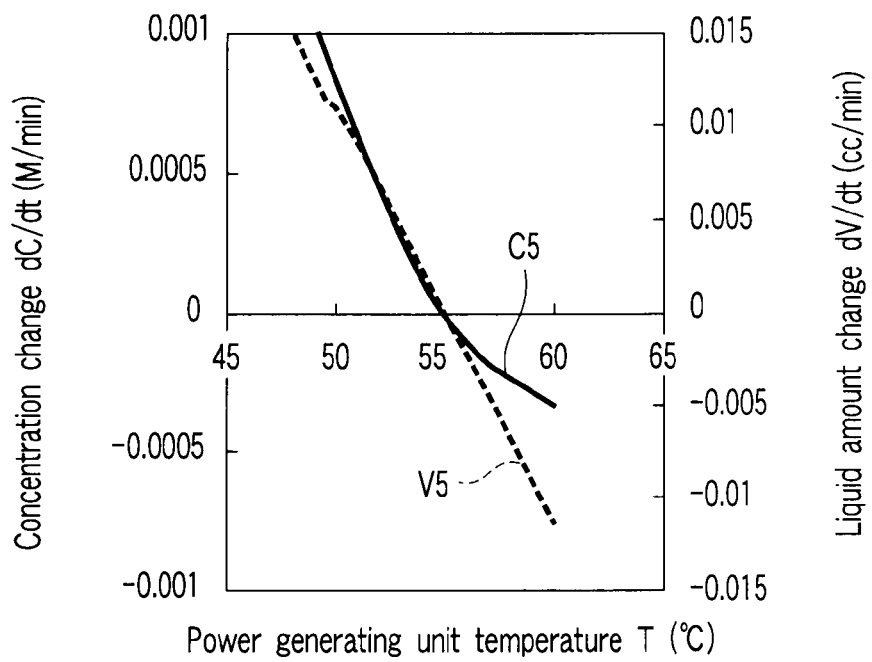
FIG. 11 is a characteristic diagram showing the relationship among the power generator temperature T, the concentration change ΔC and the liquid amount change ΔV.

A characteristic line C5 in FIG. 11 indicates the relation between the power generating unit temperature T(° C.) and the concentration change per unit time dC/dt. A characteristic line V5 indicates the relation between the power generating unit temperature T and the liquid amount change per unit time dV/dt. The power generating unit temperature T is a temperature of the power generating unit 7 measured by the temperature sensor 72 when cooled by the fan 71. At this time, other operating units (fuel supplying unit 3, fuel circulating unit 5, air supplying unit 6, power adjusting unit 8) than the fan 71 are operated under a constant condition.

When the power generating unit temperature T is changed by operating the fan 71, if the power generating unit temperature T is raised, the concentration change per unit time dC/dt and the liquid amount change per unit time dV/dt are decreased as shown in FIG. 11 (characteristic lines C5, V5). Thus, if both the concentration and amount of the mixed liquid fuel have been decreased as a result of detecting the concentration and amount of the mixed liquid fuel by means of the concentration sensor 42 and the liquid amount sensor 43, the power generating unit temperature T is lowered. Conversely, if both the concentration and amount of the mixed liquid fuel are increased, the power generating unit temperature T is raised. By operating the fan 71 in this way, the concentration and amount of the mixed liquid fuel in the mixing tank 4 can be controlled to an appropriate range.

In the above-described embodiment, the method for operating any one of the fuel supplying unit 3, the air supplying unit 6, the fuel circulating unit 5, the power adjusting unit 8, and the fan 71 in order to control the concentration and amount of the mixed liquid fuel has been described. Contrary to this, it is permissible to adopt other method for operating the fuel supplying unit 3, the fuel circulating unit 5, the power adjusting unit 8 and the fan 71 in combination. According to such other method, if the directions of increasing/decreasing the concentration and liquid amount are set to opposite to each other, the control area can be expanded by combining these operating units.

[Control of the Concentration and Amount of Mixed Liquid Fuel by Air Supplying Unit and Fuel Circulating Unit]

Next, with reference to the flow chart of FIG. 12, there will be described a method for controlling the concentration and amount of the mixed liquid fuel in the mixing tank 4 by operating the air supplying unit 6 and the fuel circulating unit 5 in the above-described fuel cell system 1.

This system 1 includes a step of detecting the concentration of the mixed liquid fuel in the mixing tank 4 during an operation of the power generating unit 7 and a step of detecting the amount of the mixed liquid fuel. Detected information is processed in the control unit 10 as follows.

FIG. 13 shows a schematic configuration of the control unit 10. The control unit 10 includes the control database 30 containing various kinds of process data and the processing unit 20 which determines an operating condition from various kinds of detection signals S1, S2, S3 and the process data and provides an operation signal to each operating unit (fuel circulating unit 5, air supplying unit 6 and the like).

The control database 30 has stored therein, as process data, a table containing correlation data which relates the fuel supply amount $Qa^{MeOH}$ to $\alpha$ and $\beta$, and air supply amount $Qc^{Air}$ to $\alpha$ and $\beta$ as shown in FIG. 13. Further, because $\alpha$ is changed depending on the power generating unit temperature T and/or the load current I, the control database 30 has stored therein correlation data which relates these parameters T, I to the correction value. Further, as well as the above-described correlation data, the control database 30 has stored therein data relating to a time response until $\alpha$, $\beta$ are changed after the fuel circulating unit 5 and the air supplying unit 6 are operated.

The control unit 10 calculates an output signal to be sent to the fuel circulating unit 5 and the air supplying unit 6 using the process data of the control database 30 and outputs an operation signal to the fuel circulating unit 5 and the air supplying unit 6 based on these calculation values.

The concentration detection signal S1 and the liquid amount (liquid level) detection signal S2 of the mixed liquid fuel are sent to the processing unit 20, which determines a status about the concentration and amount of the mixed liquid fuel. As a method for determining the status about the concentration and amount of the mixed liquid fuel, there are a method for determining whether or not that status is acceptable using a threshold to each parameter, and a method for measuring the concentration and amount of the mixed liquid fuel in the mixing tank 4 by sampling at each predetermined time and determining whether or not it is acceptable based on the change amounts.

A process in which the control unit 10 reads out data from the control database 30 and sends an operation signal to the fuel circulating unit 5 and the air supplying unit 6 through the processing unit 20 is as follows.

First, a difference between an upper limit value or a lower limit value of an appropriate range area of the concentration and amount of the mixed liquid fuel and the detection signals S1 and S2 is obtained and further, $\Delta C(M)$ and $\Delta V(cc)$ are obtained. Next, consumption of methanol and water in the power generating unit is changed based on the following equations (5), (6), wherein D is consumption fuel density and L is fuel consumption volume.

$$D = \frac{(1+\beta)}{(1+\beta)*\frac{32}{0.79} + (1+6\alpha)*18} \quad (5)$$

$$L = \frac{(1+\beta)}{6F}I*\frac{32}{0.79} + \frac{(1+6\alpha)}{6F}*18I \quad (6)$$

To control both the amount and concentration of the mixed liquid fuel, weighing factors $a_1$, $b_1$ are attached as required as indicated in the following equation (7) and the control is made by taking both the concentration and amount into account.

$$f = a_1(D_1 - D_0) + b_1(L_1 - L_0) \quad (7)$$

where:
$D_0$: concentration (M) of mixed liquid fuel consumed in the power generating unit at the time of rated operation
$D_1$: concentration (M) of mixed liquid fuel consumed in the power generating unit at the time of control operation
$L_0$: consumption rate of mixed liquid fuel in the power generating unit at the time of rated operation
$L_1$: consumption rate of mixed liquid fuel in the power generating unit at the time of control operation
$a_1$: weighing factor of concentration
$b_1$: weighing factor of consumption rate A concentration $D_0$ of the mixed liquid fuel and a consumption rate $L_0$ of the mixed liquid fuel are values which are automatically determined from $\alpha$, $\beta$ at the time of rated operation, and are given to the control unit 10 of this control system 1.

For example, when the fuel concentration change $\Delta C$ of the mixing tank 4 is a positive value, the control unit 10 selects parameters $\alpha$, $\beta$ from the correlation data of the control database 30 based on (5) and (7). The selected $\alpha$, $\beta$ change the concentration of the mixed liquid fuel to be consumed in the power generating unit 7 from the aforementioned concentration $D_0$ to a concentration $D_1$ ($D_0 < D_1$). When the parameters $\alpha$, $\beta$ are selected, the values of the air supply amount $Qc^{Air}$ and fuel supply amount $Qa^{MeOH}$ are automatically determined from the correlation data. The processing unit 20 computes based on the values of the $Qc^{Air}$ and $Qa^{MeOH}$ and outputs operation signals S4, S5 to the air supplying unit 6 and the fuel circulating unit 5. Consequently, this system 1 is controlled to be driven so that the concentration of the mixed liquid fuel to be consumed in the power generating unit 7 is changed from the concentration $D_0$ to the concentration $D_1$.

For example when the liquid amount change $\Delta V$ is a positive value, the control unit 10 selects the parameters $\alpha$, $\beta$ from the correlation data of the control database 30 based on the aforementioned equations (5), (6). The selected $\alpha$, $\beta$ change the consumption rate of the mixed liquid fuel in the power generating unit from the consumption rate $L_0$ to the consumption rate $L_1$ ($L_0 < L_1$). When the parameters $\alpha$, $\beta$ are selected, the values of the air supply amount $Qc^{Air}$ and the fuel supply amount $Qa^{MeOH}$ are automatically determined from the correlation data. The processing unit 20 computes based on the values of the $Qc^{Air}$ and $Qa^{MeOH}$ and outputs signals S4, S5 to the air supplying unit 6 and the fuel circulating unit 5. Consequently, this system 1 is controlled to be driven, so that the consumption rate of the mixed liquid fuel in the power generating unit 7 is changed from the consumption rate $L_0$ to the consumption rate $L_1$.

As a method of controlling the fuel circulating unit 5, a method of changing the frequency of vibration and revolution number of a liquid feeding pump or a method of providing the fuel circulating unit 5 with an orifice so as to control the flow rate by providing a pressure loss in front/in the back thereof is available. If a pneumatic pump is provided on the air supplying unit 6, the vibration and revolution number of the pump are changed. If the air supplying unit 6 is provided with a fan, the revolution number of the fan is changed. If the air supplying unit 6 is provided with an orifice, the intake and the exit of the air adjusting unit 6 are provided with an orifice so as to change the pressure loss.

Figure 12:
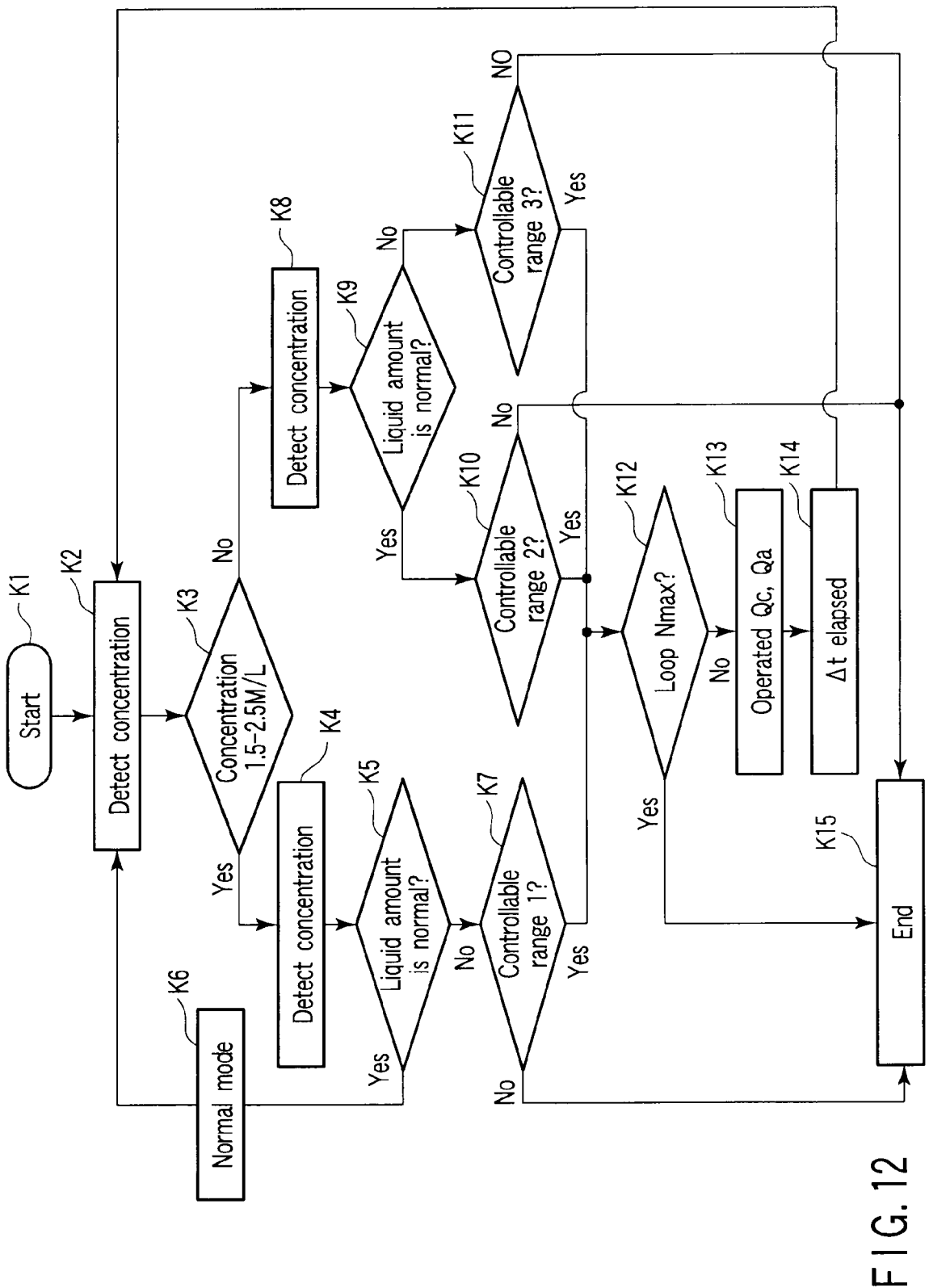
FIG. 12 is a flow chart about control of the concentration and amount of fuel in the embodiment of the present invention.

First, the concentration of the mixed liquid fuel is detected by the concentration sensor 42 as shown in FIG. 12 so that the processing unit 20 determines whether or not the concentration of the mixed liquid fuel is within a predetermined range. According to this embodiment, an area in which the output of the power generating unit 7 can be maintained over a constant level, 1.5M to 2.5M is a predetermined range. If the concentration of the mixed liquid fuel is within the predetermined range, the liquid amount V of the mixed liquid fuel is detected by the liquid amount sensor 43 and whether or not the liquid amount of the mixed liquid fuel is within the predetermined range is determined by the processing unit 20. If the liquid amount of the mixed liquid fuel is within the predetermined range, the concentration and amount of the mixed liquid fuel are within the predetermined range and thus, a current air supply amount $Qc^{Air}$ and fuel supply amount $Qa^{MeOH}$ are maintained (K1→K2→K3→K4→K5→K6).

If the concentration of the mixed liquid fuel is within the predetermined range, the amount of the mixed liquid fuel is detected by the liquid amount sensor 43. If it is determined that this detected liquid amount is not within the predetermined range, whether or not the liquid amount of the mixed liquid fuel can be controlled is determined (K1→K2→K3→K4→K5→K7). Here, as regards whether or not the liquid amount of the mixed liquid fuel can be controlled, predetermined upper limit value and lower limit value are set up preliminarily and if the detected liquid amount is in a range from the upper limit value to the lower limit value, it is determined that it can be controlled. If it is out of that range, it is determined that it cannot be controlled. If it is determined that the liquid amount of the mixed liquid fuel cannot be controlled, the processing is terminated (K7→K15).

If it is determined that it can be controlled, the control unit 10 select the parameters α, β and the air supply amount $Qc^{Air}$ and fuel supply amount $Qa^{MeOH}$ which are the selected α, β, are determined and signals S4, S5 are output to the air supplying unit 6 and the fuel circulating unit 5 based on these values. Consequently, a change of the concentration $D_1$ of the mixed liquid fuel to be consumed in the power generating unit 7 from the concentration $D_0$ is suppressed (reduction of an absolute value $|D_1-D_0|$, a change of the consumption rate $L_1$ of the mixed liquid fuel from the consumption rate $L_0$ of the mixed liquid fuel is increased (increase of $|L_1-L_0|$).

If the liquid amount of the mixed liquid fuel falls into a predetermined target range after a predetermined time Δt elapses since an output of the operation signal, the air supply amount $Qc^{Air}$ and the fuel supply amount $Qa^{MeOH}$ are adjusted to values at the time of the rated operation and the signals S4, S5 are output to the fuel circulating unit 5 and the air supplying unit 6 based on these values (K7→K12→K13→K14→K2→K3→K4→K5→K6).

Unless the liquid amount of the mixed liquid fuel falls into the predetermined range after the predetermined time Δt elapses, the control loop is repeated until it falls into the predetermined range. However, when the liquid amount of the mixed liquid fuel is not within the predetermined range even if this loop is repeated N times, the loop is terminated (K7→K12→K13→K14→K2→K3→K4→K5→K7→K12→K15).

Unless the concentration of the mixed liquid fuel exists in the predetermined range, the amount of the mixed liquid fuel is detected so as to determine whether or not the amount of the mixed liquid fuel is within the predetermined range by means of the processing unit 20. Then, if the amount of the mixed liquid fuel is within the predetermined range, the concentration of the mixed liquid fuel is abnormal and whether or not the concentration of the mixed liquid fuel can be controlled is determined (K1→K2→K3→K8→K9→K10). As regards whether or not the concentration of the mixed liquid fuel is within the controllable range, an area of the concentration of the mixed liquid fuel which enables generation of power in the power generating unit 7 is indicated and as for the upper limit value and lower limit value, if it is over the lower limit value 1.0M and below the upper limit value 3.0M in this embodiment, it is determined that the concentration of the mixed liquid fuel is controllable and if it is above or below any of the values, it can be determined that the concentration is not controllable. If it is determined that the concentration is uncontrollable, the processing is terminated (K10→K15).

If it is determined that the concentration is controllable, the control unit 10 selects α, β which intensify changes in the concentration $D_1$ of the mixed liquid fuel consumed in the power generating unit 7 from the concentration $D_0$ of the mixed liquid fuel and suppress changes in the consumption rate $L_1$ of the mixed liquid fuel in the power generating unit 7 from the consumption rate $L_0$ of the mixed liquid fuel, determine the values of the air supply amount $Qc^{Air}$ and the fuel supply amount $Qa^{MeOH}$ which turn to the selected α, β and then, output operation signals S5, S4 to the air supplying unit 6 and the fuel circulating unit 5 based on these values. Then, if the concentration of the mixed liquid fuel falls into the predetermined range after the predetermined time Δt elapses since the operation signal is output, the air supply amount $Qc^{Air}$ and the fuel supply amount $Qa^{MeOH}$ are adjusted to values at the time of the rated operation and the operation signal is output to the fuel circulating unit 5 and the air supplying unit 6 based on these values (K10→K12→K13→K14→K2→K3→K4→K5→K6). Further, unless the concentration of the mixed liquid fuel falls into the predetermined range after the predetermined time Δt elapses, the loop is repeated until the concentration falls into the predetermined range. However, when the concentration of the mixed liquid fuel is not within the predetermined range even if this loop is repeated N times, the loop is terminated (K10→K12→K13→K14→K2→K3→K8→K9→K10→K12→K15).

If the concentration of the mixed liquid fuel does not exist in the predetermined range and further it is determined that the amount of the mixed liquid fuel does not exist in the predetermined range by the processing unit 20, the procedure is moved to a step of controlling the concentration and amount of the mixed liquid fuel. Then, whether or not the concentration and amount of the mixed liquid fuel are controllable is determined (K1→K2→K3→K8→K9→K11). Here, as regards whether or not the concentration and amount of the mixed liquid fuel are in the controllable range, if the concentration of the mixed liquid fuel is below a predetermined upper limit value and above a predetermined lower limit value, in this embodiment, an upper limit value of 3.0M and a lower limit value of 1.0M and the amount of the mixed liquid fuel is above the upper limit value and below the lower limit value, it is determined that the concentration and amount are controllable and in other cases, it is determined that they are uncontrollable. If it is determined that the concentration and amount are uncontrollable, the processing is terminated (K11→K15).

If it is determined that the concentration and amount are controllable, the control unit 10 determines the concentration $D_1$ of the mixed liquid fuel and the consumption rate $L_1$ of the mixed liquid fuel by applying weights due to a change of the concentration $D_1$ of the mixed liquid fuel consumed in the power generating unit 7 from the concentration $D_0$ of the mixed liquid fuel and a change of the consumption rate $L_1$ of the mixed liquid fuel in the power generating unit 7 from the consumption rate $L_0$ of the mixed liquid fuel. Then, $\alpha$, $\beta$ corresponding to these values are selected and the values of the air supply amount $Qc^{Air}$ and the fuel supply amount $Qa^{MeOH}$ which turn to the selected $\alpha$, $\beta$ are determined, and the operation signal is output to the air supplying unit 6 and the fuel circulating unit 5 based on these values. If the amount and the concentration of the mixed liquid fuel fall in the predetermined range after the predetermined time $\Delta t$ elapses since the operation signal is output, the air supply amount $Qc^{Air}$ and fuel supply amount $Qa^{MeOH}$ are adjusted to values at the time of the rated operation and the operation signal is output to the fuel circulating unit 5 and the air supplying unit 6 based on these values (K11→K12→K13→K14→K2→K3→K4→K5→K6). Unless the concentration and amount of the mixed liquid fuel fall in the predetermined range after the predetermined time $\Delta t$ elapses, the loop is repeated until they fall in the predetermined range. If the concentration and amount of the mixed liquid fuel do not exist within the predetermined range even if this loop is repeated N times, the loop is terminated (K11→K12→K13→K14→K2→K3→K8→K9→K11→K12→K15).

According to the fuel cell system and the fuel cell system control method of this embodiment, if the content of control of the control unit 10 is considered individually, when the fuel circulating unit 5 is controlled, the fuel supply amount $Qa^{MeOH}$ is changed so as to change the crossover amounts of methanol and water (FIG. 4), so that both the concentration and amount of the mixed liquid fuel can be controlled (FIG. 9).

When the air supplying unit 6 is controlled, the air supply amount $Qc^{Air}$ is changed so as to change the crossover amount of methanol and water (FIG. 3) and control the amount of the mixed liquid fuel (FIG. 8).

Second Embodiment

Next, a second embodiment of the present invention will be described.

According to the second embodiment, to adjust the concentration and amount of the mixed liquid fuel, the fuel circulating unit 5 and the air supplying unit 6 are controlled and further, the power adjusting unit 8 is controlled to change the load current I.

If the power adjusting unit 8 is controlled, as shown in FIG. 10, the concentration change per unit time dC/dt can be increased extremely with respect to the liquid amount change per unit time dV/dt. On the other hand, if the air supplying unit 6 is controlled, the concentration change per unit time dC/dt is very small with respect to the liquid amount change per unit time dV/dt as shown in FIG. 8. Then, the fuel circulating unit 5 and the air supplying unit 6 are controlled and at the same time, the load current I is controlled by the power adjusting unit 8.

In the meantime, the conditions for controlling the load current I of the power adjusting unit 8 are the following (1) and (2).

(1) In case where the concentration C and the amount V of the mixed liquid fuel cannot be controlled in a predetermined range by controlling the fuel supply amount $Qa^{MeOH}$ and the air supply amount $Qc^{Air}$ without considering the load current I (2) In case where both $\Delta C$ and $\Delta V$ are decreased or increased under the aforementioned condition (1)

In the fuel cell system 1 shown in FIG. 1, the power adjusting unit 8 is connected to the control unit 10 in order to control the load current I supplied to the load 9 from the power generating unit 7. That is, the control unit 10 can control the load current I by outputting an operation signal S8 to the power adjusting unit 8. As for the control range of the load current I, in order to prevent the polarity of an electrode from inversing due to shortage of fuel in the anode electrode, the fuel supply amount $Qa^{MeOH}$ necessary for generation of power changes a current in an area less than the load current I to satisfy the following equation (8) with a current in some area as the maximum load current value $I^{max}(A)$.

$$I^{max}(A) < Q_a^{\mathrm{MeOH}} \frac{6FC}{1000} \qquad (8)$$

where the fuel supply amount $Qa^{MeOH}$ is a fuel supply amount of the mixed liquid fuel to be supplied to the anode electrode, F is a Faraday constant and C is a concentration (M) of the mixed liquid fuel. Assume that the supply amount of fuel from the high concentration fuel tank 2 to the mixing tank 4 is constant with the same flow rate as the condition of the first embodiment.

Figure 14:
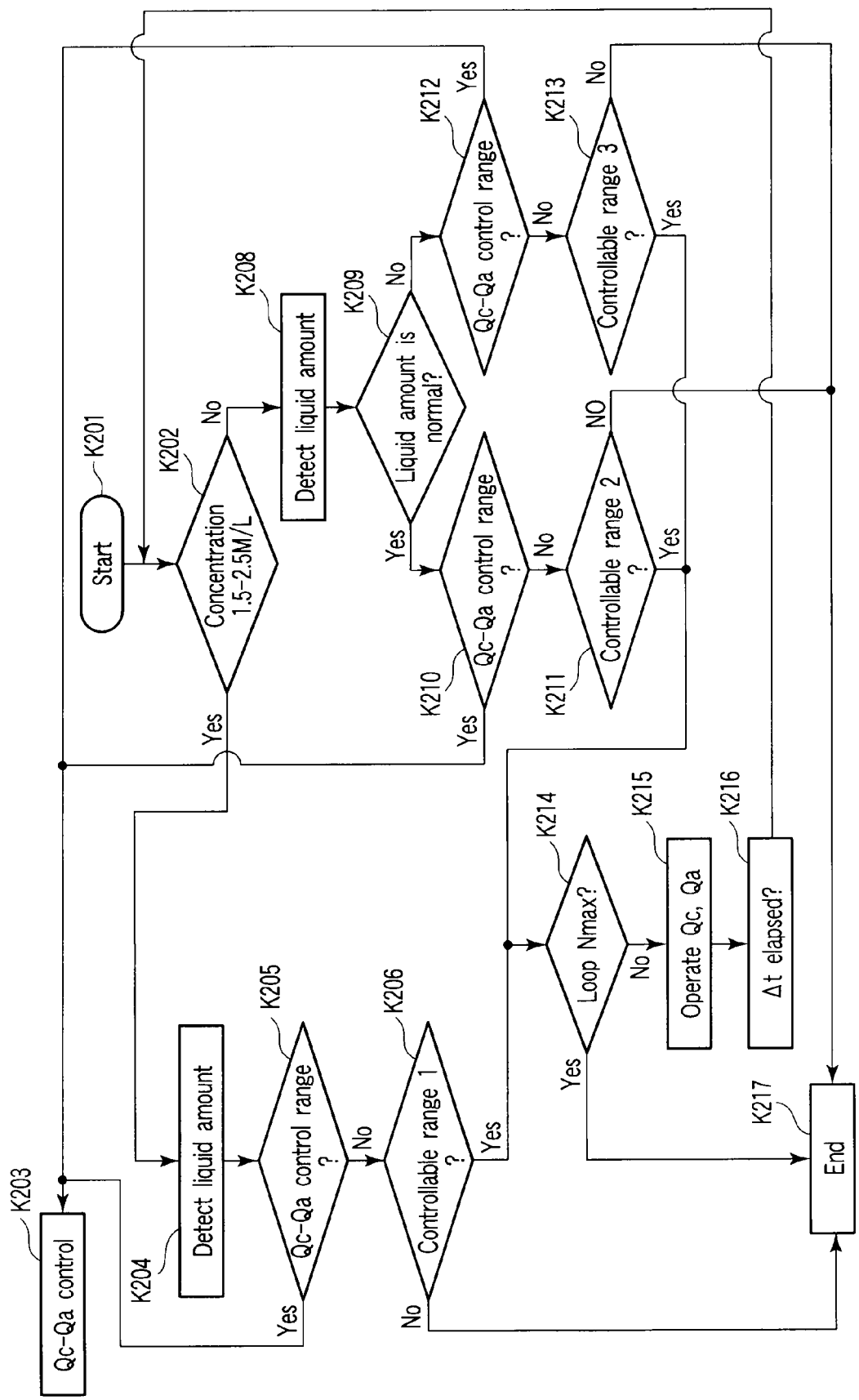
FIG. 14 is a flow chart about control of the concentration and amount of fuel in another embodiment.

FIG. 14 shows a control flow chart of this embodiment. First, the concentration of the mixed liquid fuel is detected using the concentration sensor 42 and whether or not the concentration of the mixed liquid fuel is within a predetermined range is determined by the processing unit 20. In this embodiment, 1.5M to 2.5M which is an area in which the output of the power generating unit 7 can be kept over a constant level is assumed to be the predetermined range. If the mixed liquid fuel concentration is within the predetermined range, the amount of the mixed liquid fuel is detected using the liquid amount sensor 43 and whether or not the amount of the mixed liquid fuel can be controlled by the air supply amount $Qc^{Air}$ and the fuel supply amount $Qa^{MeOH}$ is determined (K201→K202→K204→K205). Here, as for whether or not the amount of the mixed liquid fuel is controllable, predetermined upper limit value and lower limit value are set up preliminarily and if the amount of the mixed liquid fuel is below the upper limit value and above the lower limit value, it can be determined to be controllable and if it is above or below the values, it can be determined to be uncontrollable.

If it is determined that the amount of the mixed liquid fuel can be controlled by the air supply amount $Qc^{Air}$ and the fuel supply amount $Qa^{MeOH}$, the air supply amount $Qc^{Air}$ and fuel supply amount $Qa^{MeOH}$ can be controlled and then, the procedure is moved to control by the air supply amount $Qc^{Air}$ and the fuel supply amount $Qa^{MeOH}$, for example, the control shown in FIG. 12 (K205→K203). On the other hand, if it is determined that the amount of the mixed liquid fuel is uncontrollable, next, whether or not the amount of the mixed liquid fuel can be controlled by the air supply amount $Qc^{Air}$, the fuel supply amount $Q^{MeOH}$ and the load current I is determined. As for whether or not the amount of the mixed liquid fuel is controllable, predetermined upper limit value and lower limit value are set up preliminarily and if a detected amount is found in a range from the upper limit value to the lower limit value, it is determined that it is controllable and if the detected amount is out of that range, it is determined that it is uncontrollable. If it is determined that the amount of the mixed liquid fuel is controllable, the processing is terminated (K205→K206→K217).

If it is determined that the amount of the mixed liquid fuel is controllable, the content determined currently is that the concentration of the mixed liquid fuel is normal, the amount of the mixed liquid fuel cannot be controlled by the air supply amount $Qc^{Air}$ and the fuel supply amount $Qa^{MeOH}$ and it can be controlled by the air supply amount $Qc^{Air}$, the fuel supply amount $Qa^{MeOH}$ and the load current I. Thus, the procedure is moved to a process K215 for controlling the air supply amount $Qc^{Air}$, fuel supply amount $Qa^{MeOH}$, and load current I (K206→K214→K215). The control loop action of the process K215→K216→K202→K204→K205→K206→K214 is executed by controlling the operation amounts of the fuel circulating unit 5, the air supplying unit 6 and the power adjusting unit 8 and then by adjusting the $Qc^{Air}$, $Qa^{MeOH}$ and load current I. Then, if the amount of the mixed liquid fuel does not become normal even if the control loop action of operating the fuel circulating unit 5, the air supplying unit 6 and the power adjusting unit 8 is executed over a specified time, the procedure goes out of the loop so as to terminate the processing (K214→K217; time limited).

More specifically, if it is determined that the concentration C of the mixed liquid fuel is appropriate and the amount V of the mixed liquid fuel is controllable by operation of the air supply amount $Qc^{Air}$, fuel supply amount $Qa^{MeOH}$ and load current I although it is uncontrollable by operation of the air supply amount $Qc^{Air}$ and the fuel supply amount $Qa^{MeOH}$, the control unit 10 selects the parameters α, β from correlation data of the control database 30. The selected α, β decrease a difference between the concentration $D_1$ (at the time of control operation) and the concentration $D_0$ (at the time of rated operation)(absolute value $|D_1-D_0|$ decreases) and increase a difference between the consumption rate $L_1$ (at the time of control operation) and consumption rate $L_0$ (at the time of rated operation) (absolute value $|L_1-L_0|$ increases), so that the concentration of the mixed liquid fuel to be consumed in the power generating unit 7 is in the range of 1.5M to 2.5M.

The Control unit 10 determines the values of the air supply amount $Qc^{Air}$, fuel supply amount $Qa^{MeOH}$ and the load current I from the selected α, β and outputs the operation signals S5, S4, S8 to the air supplying unit 6, the fuel circulating unit 5 and the power adjusting unit 8 based on these values. When the amount V of the mixed liquid fuel falls in a predetermined range after a predetermined time Δt elapses since the operation signal is output, the operation signals S5, S4, S8 are output to the air supplying unit 6, the fuel circulating unit 5 and the power adjusting unit 8 so as to return the values of the air supply amount $Qc^{Air}$, the fuel supply amount $Qa^{MeOH}$ and the load current I to the values at the time of the rated operation (K203→K1→K2→K3→K4→K5→K6). Unless the amount of the mixed liquid fuel falls in the predetermined range after the predetermined time Δt elapses, the loop is repeated until it falls into the predetermined range. However, when the amount of the mixed liquid fuel is not within the predetermined range even if this loop is repeated N times, the loop is terminated (K206→K214→K217).

In the meantime, if it is determined that the concentration of the mixed liquid fuel is normal and the amount of the mixed liquid fuel can be controlled by the air supply amount $Qc^{Air}$ and the fuel supply amount $Qa^{MeOH}$, the control unit 10 executes the control loop shown in FIG. 12 for controlling the concentration C and the amount V by operating the fuel circulating unit 5 and the air supplying unit 6 (K203). If it is determined that the concentration of the mixed liquid fuel is normal, the amount of the mixed liquid fuel cannot be controlled by the air supply amount $Qc^{Air}$ and the fuel supply amount $Qa^{MeOH}$ while it can be controlled by the air supply amount $Qc^{Air}$, the fuel supply amount $Qa^{MeOH}$ and the load current I, the control unit 10 operates the fuel circulating unit 5, the air supplying unit 6 and the power adjusting unit 8 so as to control the amount V while the concentration C is limited to an appropriate range.

Unless the concentration of the mixed liquid fuel is within the predetermined range, next, the amount of the mixed liquid fuel is detected so as to determine whether or not the amount of the mixed liquid fuel is within the predetermined range by means of the processing unit 20. Then, if the amount of the mixed liquid fuel is within the predetermined range, whether or not it can be controlled by the air supply amount $Qc^{Air}$ and the fuel supply amount $Qa^{MeOH}$ is determined (K202→K208→K209→K210).

According to this embodiment, if the concentration of the mixed liquid fuel is in a range above the lower limit value 1.0M and below the upper limit value 3.0M, it can be determined that the concentration can be controlled and if the concentration of the mixed liquid fuel is out of this range, it can be determined that the concentration cannot be controlled. If it is determined that the amount of the mixed liquid fuel can be controlled by the air supply amount $Qc^{Air}$ and the fuel supply amount $Qa^{MeOH}$, the air supply amount $Qc^{Air}$ and the fuel supply amount $Qa^{MeOH}$ can be controlled and then, the procedure is moved to a control shown in FIG. 12, that is, the control by the air supply amount $Qc^{Air}$ and the fuel supply amount $Qa^{MeOH}$ (K203).

On the other hand, if it is determined that the amount of the mixed liquid fuel cannot be controlled, whether or not it can be controlled by the air supply amount $Qc^{Air}$, fuel supply amount $Qa^{MeOH}$ and load current I is determined (K210→K211). As for whether or not the amount of the mixed liquid fuel can be controlled, predetermined upper limit value and lower limit value are set preliminarily and if it is in a range below the upper limit value and above the lower limit value, it is determined that the amount can be controlled and if it is out of this range, it can be determined that the amount cannot be controlled. If it is determined that the amount cannot be controlled, the procedure is terminated (K211→K217).

If it is determined that the amount can be controlled, the content determined currently is that the concentration of the mixed liquid fuel is not within the predetermined range and the amount V of the mixed liquid fuel cannot be controlled by the air supply amount $Qc^{Air}$ and fuel supply amount $Qa^{MeOH}$ while it can be controlled by the air supply amount $Qc^{Air}$, fuel supply amount $Qa^{MeOH}$ and load current I. Thus, the procedure is moved to a process K215 for controlling the air supply amount $Qc^{Air}$, fuel supply amount $Qa^{MeOH}$ and load current I (K211→K214→K215). The control loop action of the process K215→K216→K202→K208→K209→K210→K211→K214 is executed by controlling the operation amount of the fuel circulating unit 5, the air supplying unit 6 and the power adjusting unit 8 to adjust the $Qc^{Air}$, $Qa^{MeOH}$ and load current I. Unless the amount of the mixed liquid fuel becomes normal even if the control loop action for operating the fuel circulating unit 5, the air supplying unit 6 and the power adjusting unit 8 is repeated more than a specified time, the procedure is taken out of that control loop and the processing is terminated (K214→K217; time limited).

More specifically, if it is determined that the concentration C of the mixed liquid fuel is not within the predetermined range, the amount V of the mixed liquid fuel cannot be controlled by the air supply amount $Qc^{Air}$ and the fuel supply amount $Qa^{MeOH}$ while it can be controlled by the air supply amount $Qc^{Air}$, fuel supply amount $Qa^{MeOH}$ and load current I, the control unit 10 selects α, β like the first embodiment, and increases a change of the concentration $D_1$ of the mixed liquid fuel to be consumed in the power generating unit 7 from the concentration $D_0$ of the mixed liquid fuel using the selected α, β so that the concentration C of the mixed liquid fuel is in a predetermined range from 1.5M to 2.5M, in order to suppress a change of the consumption rate $L_1$ of the mixed liquid fuel from the consumption rate $L_0$. That is, the value of the air supply amount $Qc^{Air}$ and the value of the fuel supply amount $Qa^{MeOH}$, which turn to the selected α, β, and the value of the load current I are determined and the operation signals S5, S4, S8 are respectively output to the air supplying unit 6, the fuel circulating unit 5 and the power adjusting unit 8 based on these values.

If the concentration C of the mixed liquid fuel falls in a predetermined range after the predetermined time Δt elapses since the operation signal is output, the operation signals S5, S4, S8 are respectively output to the air supplying unit 6, the fuel circulating unit 5 and the power adjusting unit 8 in order to return the air supply amount $Qc^{Air}$, fuel supply amount $Qa^{MeOH}$ and the load current I to the values at the time of the rated operation (K203→K1→K2→K3→K4→K5→K6). Unless the concentration C of the mixed liquid fuel falls in the predetermined range after the predetermined time Δt elapses, the loop is repeated until it falls in the predetermined range. However, unless the concentration of the mixed liquid fuel falls in the predetermined range even if this loop is repeated N times, the loop is terminated (K211→K214→K217).

In the meantime, if it is determined that the concentration of the mixed liquid fuel is normal and the amount of the mixed liquid fuel can be controlled by the air supply amount $Qc^{Air}$ and the fuel supply amount $Qa^{MeOH}$, the control unit 10 executes the control loop shown in FIG. 12 for controlling the concentration C and the amount V by operating the fuel circulating unit 5 and the air supplying unit 6 (K203). If it is determined that the concentration of the mixed liquid fuel is normal and the amount of the mixed liquid fuel cannot be controlled by the air supply amount $Qc^{Air}$ and the fuel supply amount $Qa^{MeOH}$ while it can be controlled by the air supply amount $Qc^{Air}$, the fuel supply amount $Qa^{MeOH}$ and the load current I, the control unit 10 controls the concentration C by operating the fuel circulating unit 5, the air supplying unit 6 and the power adjusting unit 8 while the amount V is limited to an appropriate range.

If the processing unit 20 determines that the concentration of the mixed liquid fuel is not within the predetermined range and the amount is not within the predetermined range, it determines whether or not they can be controlled by the air supply amount $Qc^{Air}$ and the fuel supply amount $Qa^{MeOH}$ (K204→K208→K209→K212).

According to this embodiment, if the concentration is in a range above the lower limit value 1.0M and below the upper limit value 3.0M, it is determined that the concentration can be controlled and if it is out of this range, the concentration cannot be controlled. If it is determined that the amount of the mixed liquid fuel can be controlled by the air supply amount $Qc^{Air}$ and the fuel supply amount $Qa^{MeOH}$, it can be controlled by the air supply amount $Qc^{Air}$ and the fuel supply amount $Qa^{MeOH}$ and the procedure is moved to the control by the air supply amount $Qc^{Air}$ and the fuel supply amount $Qa^{MeOH}$, for example, the control shown in FIG. 12 (K212→K203).

On the other hand, if it is determined that the concentration of the mixed liquid fuel cannot be controlled, next, whether or not the amount of the mixed liquid fuel can be controlled by operations of the air supply amount $Qc^{Air}$, the fuel supply amount $Qa^{MeOH}$ and the load current I is determined (K212→K213). As for whether or not the amount of the mixed liquid fuel can be controlled, predetermined upper limit value and lower limit value are set preliminarily and if the amount is in a range from the upper limit value to the lower limit value, it is determined that the amount can be controlled and if it is out of that range, it is determined that the amount cannot be controlled. If it is determined that the amount cannot be controlled, the procedure is terminated (K213→K217).

If it is determined that the amount can be controlled, the procedure is moved to a step K215 of controlling the air supply amount $Qc^{Air}$, fuel supply amount $Qa^{MeOH}$ and the load current I (step K213→step K214→step K215). The control loop action of step K214→step K215→step K216→step K202→step K208→step K209→step K212→step K213→step K214 is executed by controlling the operation amounts of the fuel circulating unit 5, the air supplying unit 6 and the power adjusting unit 8 to adjust the $Qc^{Air}$, $Qa^{MeOH}$ and load current I. Then, unless the amount of the mixed liquid fuel becomes normal even if the control loop action of operating the fuel circulating unit 5, air supplying unit 6 and power adjusting unit 8 is repeated more than a specified time, the processing is taken out of that loop and the processing is terminated (step K214→step K217; time limited).

More specifically, if it is determined that the concentration and amount of the mixed liquid fuel are not within each predetermined range and the amount of the mixed liquid fuel cannot be controlled by the air supply amount $Qc^{Air}$ and the fuel supply amount $Qa^{MeOH}$ while it can be controlled by the air supply amount $Qc^{Air}$, fuel supply amount $Qa^{MeOH}$ and the load current I, the power generating unit 7 determines the concentration $D_1$ and the consumption rate $L_1$ of the mixed liquid fuel by applying weights $a_1$, $b_1$ due to a change of the concentration $D_1$ of the mixed liquid fuel consumed in the power generating unit 7 from the concentration $D_0$ of the mixed liquid fuel and a change of the consumption rate $L_1$ of the mixed liquid fuel in the power generating unit 7 from the consumption rate $L_0$ of the mixed liquid fuel.

The Control unit 10 selects α, β corresponding to $D_1$, $L_1$ and determines the values of the air supply amount $Qc^{Air}$, fuel supply amount $Qa^{MeOH}$ and the load current I from the selected α, β and outputs the operation signals S5, S4, S8 to the air supplying unit 6, the fuel circulating unit 5 and the power adjusting unit 8, respectively, based on these values. When the concentration C and the amount V of the mixed liquid fuel fall in a predetermined range after a predetermined time Δt elapses since the operation signal is output, the control unit 10 outputs the operation signals S5, S4, S8 to the air supplying unit 6, the fuel circulating unit 5, and the power adjusting unit 8 so as to return the air supply amount $Qc^{Air}$ and the fuel supply amount $Qa^{MeOH}$ to the values at the time of the rated operation (K214→K215→K216→K202→K204→K205→K203).

Unless the concentration C and the amount V of the mixed liquid fuel fall in the predetermined range after the predetermined time Δt elapses, the loop is repeated until they fall into the predetermined range. However, unless the concentration C and the amount V of the mixed liquid fuel are within the predetermined range even if this loop is repeated N times, the loop is terminated (K212→K213→K214→K215→K216→K202→K208→K209→K212→K213→K214→K217)

In the meantime, if it is determined that the concentration of the mixed liquid fuel is normal and the amount of the mixed liquid fuel can be controlled by the air supply amount $Qc^{Air}$ and the fuel supply amount $Qa^{MeOH}$, the control unit 10 executes the control loop shown in FIG. 12 for controlling the concentration C and the amount V by operating the fuel circulating unit 5 and the air supplying unit 6 (K203). If it is determined that the concentration of the mixed liquid fuel is normal, the amount of the mixed liquid fuel cannot be controlled by the air supply amount $Qc^{Air}$ and the fuel supply amount $Qa^{MeOH}$ while it can be controlled by the air supply amount $Qc^{Air}$, the fuel supply amount $Qa^{MeOH}$ and the load current I, the control unit 10 operates the fuel circulating unit 5, the air supplying unit 6 and the power adjusting unit 8 so as to control the amount V and the concentration C.

According to this embodiment, not only the $Qc^{Air}$ and the $Qa^{MeOH}$ but also the load current I is handled as a control object, thereby expanding the control area about the concentration and amount of the mixed liquid fuel.

Third Embodiment

Next, a third embodiment of the present invention will be described.

According to the third embodiment, to adjust the concentration C and the amount V of the mixed liquid fuel, the fuel circulating unit 5 or the air supplying unit 6 is controlled and further the high concentration fuel supplying unit 3 is controlled to change the fuel supply amount $Qconc^{MeOH}$.

If the concentration of the mixed liquid fuel becomes lower than a predetermined concentration (for example, 1.5M) in a process of adjusting the concentration of the mixed liquid fuel, when the fuel supply amount $Qa^{MeOH}$ is adjusted by controlling the fuel circulating unit 5, there is an inclination that no sufficient methanol is supplied to the catalytic layer on the anode electrode side of power generating unit 7 thereby lowering the power generation voltage of the power generating unit 7. On the other hand, if the concentration of the mixed liquid fuel becomes higher than the predetermined concentration (for example, 2.5M), excessive methanol for generation of power is supplied to the catalytic layer on the anode electrode side of the power generating unit 7, so that β is increased thereby possibly lowering the power generation voltage of the power generating unit 7. If the concentration of the mixed liquid fuel is increased, the durability of the power generating unit 7 may be reduced remarkably. The value of this concentration is changed depending on the kind of the catalyst and the structure of the electrode used in the power generating unit 7. Then, the fuel circulating unit 5 and the air supplying unit 6 are controlled and at the same time, the fuel supply amount $Qconc^{MeOH}$ is controlled by the fuel supplying unit 3.

In the meantime, the conditions for controlling this fuel supply amount $Qconc^{MeOH}$ are the following (a) and (b).

(a) In case where the concentration of the mixed liquid fuel is below a predetermined concentration and the amount of the mixed liquid fuel in the mixing tank is about as low as the supply amount of the raw material or the high concentration fuel can be increased.

(b) In case where the concentration of the mixed liquid fuel is above the predetermined concentration, the amount of the mixed liquid fuel within the mixing tank is about as high as the raw material or the high concentration fuel can be stopped from being supplied or the supply amount thereof can be reduced.

Figure 15:
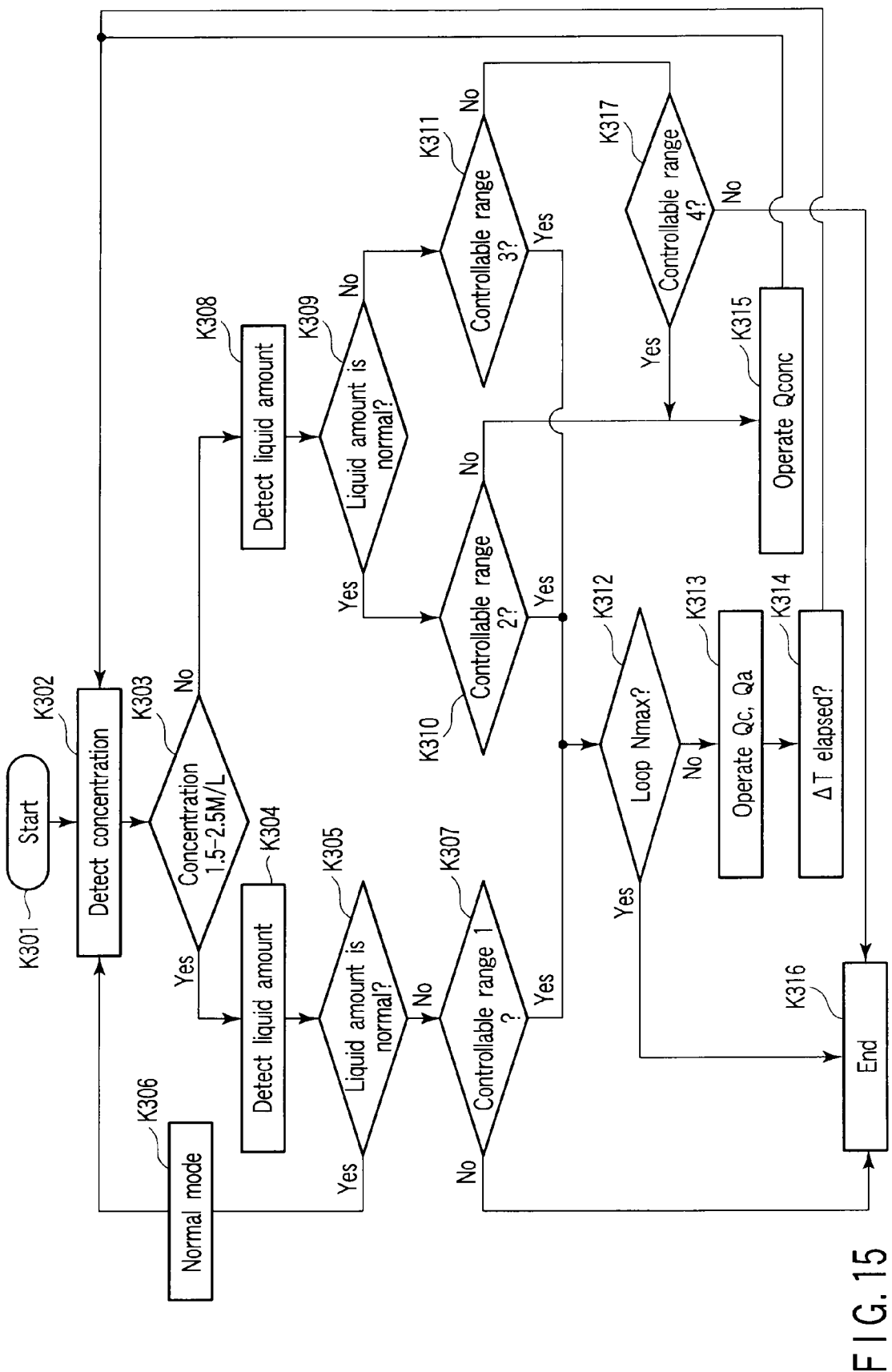
FIG. 15 is a flow chart about control of the concentration and amount of fuel in still another embodiment.

FIG. 15 shows a control flow chart of this embodiment. First, the concentration of the mixed liquid fuel is detected using the concentration sensor 42 so as to determine whether the concentration of the mixed liquid fuel is within the predetermined range by means of the processing unit 20. According to this embodiment, an area of 1.5M to 2.5M in which the output of the power generating unit 7 can be maintained over a specified level is specified as a predetermined range. If the concentration of the mixed liquid fuel is within the predetermined range, the amount of the mixed liquid fuel is detected using the liquid amount sensor 43 and the processing unit 20 determines whether or not the amount V of the mixed liquid fuel is within the predetermined range. If the amount V is within the predetermined range, the concentration and amount of the mixed liquid fuel are within each predetermined range like the first embodiment, so that a current air supply amount $Qc^{Air}$ and fuel supply amount $Q^{MeOH}$ are maintained (K301→K302→K303→K304→K305→K306).

When the concentration of the mixed liquid fuel is within the predetermined range, if it is determined that the amount of the mixed liquid fuel is not within the predetermined range as a result of detecting the amount of the mixed liquid fuel, whether or not the amount of the mixed liquid fuel can be controlled is determined like the first embodiment (K301→K302→K303→K304→K305→K307). If it is determined that the amount of the mixed liquid fuel cannot be controlled, the processing is terminated (K307→K316).

If it is determined that the amount can be controlled, the control unit 10 selects α, β like the first embodiment, determines the values of the air supply amount $Qc^{Air}$ and the fuel supply amount $Qa^{MeOH}$ from the selected α, β and then outputs the operation signals S5, S4 to the air supplying unit 6 and the fuel circulating unit 5, respectively, based on these values.

Then, if the amount of the mixed liquid fuel falls in a predetermined range after the predetermined time Δt elapses since the operation signal is output, the control unit 10 outputs the operation signals S4, S5 to the fuel circulating unit 5 and the air supplying unit 6, respectively, in order to return the air supply amount $Qc^{Air}$ and the fuel supply amount $Qa^{MeOH}$ (K307→K312→K313→K314→K302→K303→K304→K305→K306).

Unless the amount V of the mixed liquid fuel falls in the predetermined range after the predetermined time Δt elapses, the control loop is repeated until it falls in the predetermined range. Unless the amount of the mixed liquid fuel falls in the predetermined range even if this loop is repeated N times, the loop is terminated (K307→K312→K313→K314→K302→K303→K304→K305→K307→K312→K316).

If the concentration of the mixed liquid fuel is not within the predetermined range, the control unit 10 detects the amount of the mixed liquid fuel so as to determine whether or not the amount of the mixed liquid fuel is within the predetermined range. Then, if the amount of the mixed liquid fuel is within the predetermined range, whether or not the concentration of the mixed liquid fuel can be controlled is determined (K301→K302→K303→K308→K309→K310).

If it is determined that the concentration can be controlled, the control unit 10 selects α, β like the first embodiment, determines the values of the air supply amount $Qc^{Air}$ and the fuel supply amount $Qa^{MeOH}$ from the selected α, β and outputs the operation signals S5, S4 to the air supplying unit 6 and the fuel circulating unit 5, respectively. If the concentration of the mixed liquid fuel falls in the predetermined range after the predetermined time Δt elapses since the operation signal is output, the control unit 10 outputs the operation signals S4, S5 to the fuel circulating unit 5 and the air supplying unit 6, respectively, in order to return the air supply amount $Qc^{Air}$ and the fuel supply amount $Qa^{MeOH}$ to the values at the time of the rated operation (K310→ K312→ K313→K314→K302→K303→K304→K305→K306).

Unless the concentration C of the mixed liquid fuel falls in the predetermined range after the predetermined time Δt elapses, the control loop is repeated until it falls in the predetermined range. Unless the concentration C of the mixed liquid fuel falls in the predetermined range even if this loop is repeated N times, the loop is terminated (K310→K312 K313→K314→K302→K303→K308→K309→K310→ K312→K316).

If it is determined that the concentration cannot be controlled, the operation signal is output to the fuel supplying unit 3 (K315). More specifically, if the concentration C of the mixed liquid fuel detected in step K302 is below the predetermined range, for example, below the lower limit value 1.0M, an operation signal for increasing the fuel supply amount $Qconc^{MeOH}$ is output to the fuel supplying unit 3. If the concentration C detected in step K302 is above the predetermined range, for example, the upper limit value 3.0M, an operation signal for decreasing the fuel supply amount $Qconc^{MwOH}$ is output to the fuel supplying unit 3. After the operation signal is output to the fuel supplying unit, the concentration C of the mixed liquid fuel is checked again (K315→K302→K303).

If the processing unit 20 determines that the concentration C of the mixed liquid fuel is not within the predetermined range and the amount V is not within the predetermined range, whether or not the concentration C and the amount V of the mixed liquid fuel can be controlled is determined (K301→K302→K303→K308→K309→K311).

If it is determined that the concentration C and the amount V of the mixed liquid fuel can be controlled, the control unit 10 determines the concentration $D_1$ of the mixed liquid fuel and the consumption rate $L_1$ of the mixed liquid fuel by applying weights a1, b1 due to a change of the concentration $D_1$ of the mixed liquid fuel consumed in the power generating unit 7 from the concentration $D_0$ and due to a change of the consumption rate $L_1$ of the mixed liquid fuel in the power generating unit 7 from the consumption rate $L_0$. The Control unit 10 selects corresponding α, β, determines the values of the air supply amount $Qc^{Air}$ and fuel supply amount $Qa^{MeOH}$ which turn to the selected α, β and outputs the operation signals S5, S4 to the air supplying unit 6 and the fuel circulating unit 5, respectively. If the amount and the concentration of the mixed liquid fuel fall within the predetermined ranges after the predetermined time Δt elapses since the operation signal is output, the control unit 10 outputs the operation signals S5, S4 to the fuel circulating unit 5 and the air supplying unit 6, respectively, in order to return the air supply amount $Qc^{Air}$ and the fuel supply amount $Qa^{MeOH}$ to the values at the time of the rated operation (K311→K312→ K313→K314→K302→K303→K304→K305→K306).

Unless the concentration and amount of the mixed liquid fuel fall within the predetermined range after the predetermined time Δt elapses, the control loop is repeated until they fall in the predetermined range. Unless the concentration C and the amount V of the mixed liquid fuel fall within the predetermined range even if this loop is repeated N times, the loop is terminated (K311→K312→K313→K314→ K302→K303→K308→K309→K311→K312→K316).

If it is determined that the concentration and amount of the mixed liquid fuel cannot be controlled, the processing unit 20 determines whether or not the amount V of the mixed liquid fuel can be controlled by controlling the fuel supply amount $Qconc^{MeOH}$ (K311→K317). Here, as for whether or not the amount of the mixed liquid fuel is controllable, predetermined upper limit value and lower limit value are set up preliminarily and if the amount of the mixed liquid fuel is in a range below the upper limit value and above the lower limit value, it can be determined to be controllable and if it is out of this range, it can be determined to be uncontrollable. This predetermined upper limit value and lower limit value are different values from a criterion for determining whether or not the amount of the mixed liquid fuel is controllable in step K307 and step K311 and are a predetermined range for determining whether or not it is controllable by controlling the fuel supply amount $Qconc^{MeOH}$.

If it is determined that the amount of the mixed liquid fuel can be controlled by controlling the fuel supply amount $Qconc^{MeOH}$, the operation signal is output to the fuel supplying unit 3 (K315). More specifically, if the concentration of the mixed liquid fuel detected in step K302 is below the predetermined range, for example, below the lower limit value 1.0M, an operation signal for increasing the fuel supply amount $Qconc^{MeOH}$ is output to the fuel supplying unit 3. Further, if the concentration of the mixed liquid fuel detected in step K302 is above the predetermined range, for example, above the upper limit value 3.0M, an operation signal for decreasing the fuel supply amount $Qconc^{MwOH}$ is output to the fuel supplying unit 3. After the operation signal is output to the fuel supplying unit, the concentration of the mixed liquid fuel is checked again (K315→K302→K303).

If it is determined that the amount of the mixed liquid fuel cannot be controlled by controlling the fuel supply amount $Qconc^{MeOH}$, the processing is terminated (K317→K315).

According to this embodiment, not only the $Qc^{Air}$ and $Qa^{MeOH}$ but also the $Qconc^{MeOH}$ is handed as a control object, thereby expanding the control area about the concentration and amount of the mixed liquid fuel.

Fourth Embodiment

This embodiment will describe a passive type fuel cell system 1A which carries fuel using mainly natural force (for example, capillary force). The passive type fuel cell system 1A of this embodiment is different from the fuel cell system 1 of the first embodiment to third embodiment in that it does not always need the fuel supplying unit 3 and the air supplying unit 6 whose operation amounts can be controlled.

As shown in FIG. 16, the fuel cell system 1A includes the power generating unit 7, the high concentration fuel tank 2, the mixing tank 4, the power adjusting unit 8, the vapor-liquid separating unit 41, any one of an air cooling fan 71 and a heater 73, the temperature sensor 72 and a Control unit 10A.

The entire fuel cell system 1A is controlled totally by the control unit 10A. The Control unit 10A is connected to the power generating unit 7 and an auxiliary device through a line, so that various signals are exchanged among the control unit 10A, the power generating unit 7 and the auxiliary device. For example, the concentration sensor 42 detects a concentration of mixed liquid fuel (for example, methanol aqueous solution) in the mixing tank 4 and sends a concentration detection signal S1 to the control unit 10A. The temperature sensor 72 detects a temperature of the power generating unit 7 and sends a temperature detection signal S3 to the control unit 10A.

Figure 17:
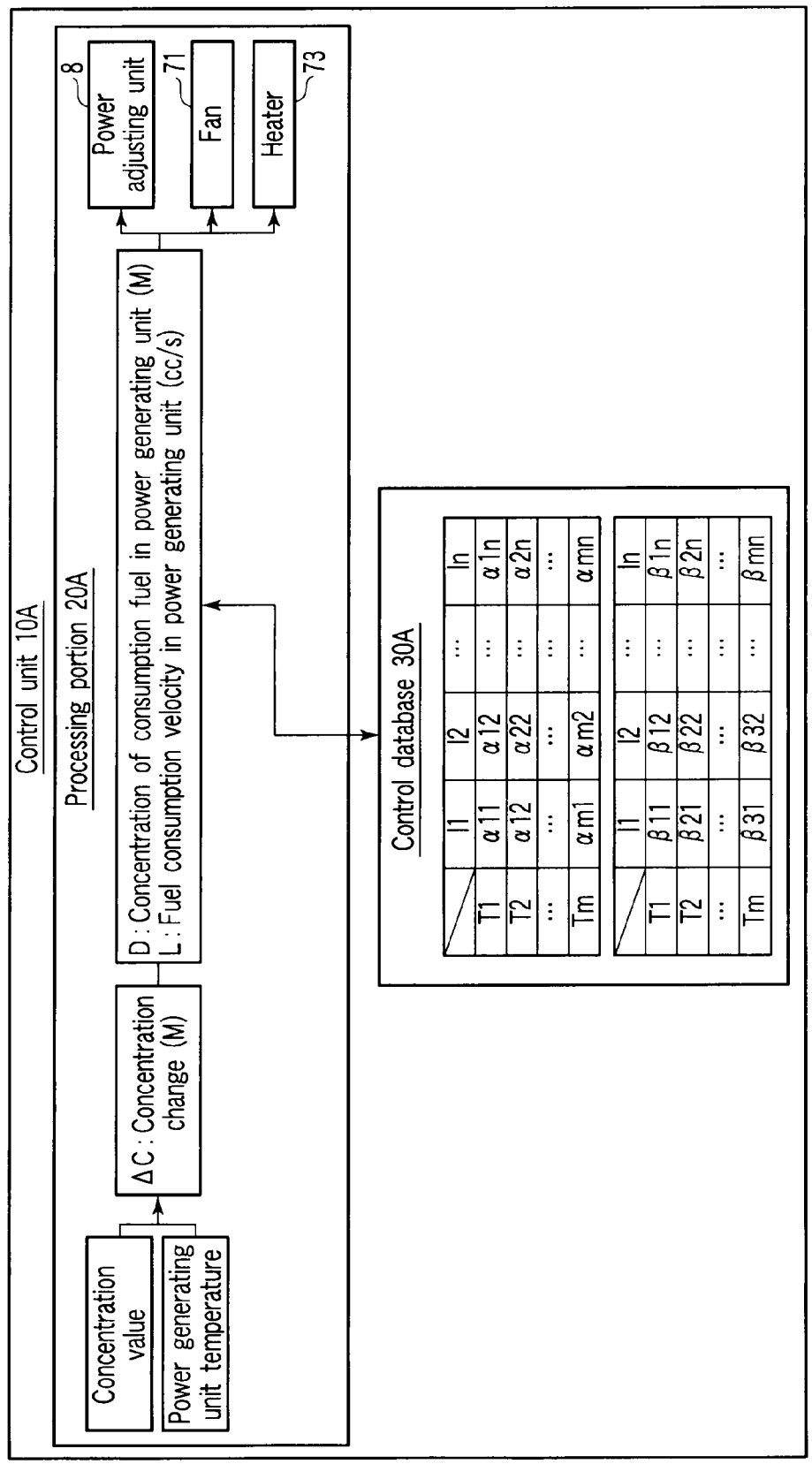
FIG. 17 is a control block diagram of the fuel cell system shown in FIG. 16.

As shown in FIG. 17, the control unit 10A obtains various control amounts based on the detection signals S1, S3 and process data of the control database 30A, obtains various kinds of operation amounts based on the obtained control amount and various parameter values of the processing unit 20A and outputs operation signals S7, S8, S9 to one or two or more of the fan 71, the power adjusting unit 8 and the heater 73. For example, when the operation signal S8 is output from the control unit 10A to the power adjusting unit 8, the load current I applied to the load 9 is adjusted to a desired value. In the meantime, as shown in FIG. 17, a table which relates the fuel supply amount QaMe$^{MeOH}$, the air supply amount Qc$^{Air}$ and the load current I to α,β is stored as process data in the control database 30A.

The power generating unit 7 is provided adjacent to the mixing tank 4 and the anode electrode of MEA in power generating unit 7 is provided so that mixed liquid fuel in the mixing tank 4 can make contact therewith. Further, the cathode electrode is provide at a position which can be supplied with external air out of the fuel cell system 1 and at a position which enables water as a by-product to be discharged out of the system.

Further, the power generating unit 7 has at least any one of the fan 71 and the heater 73, and the temperature sensor 72. The fan 71 and the heater 73 are used as temperature adjusting means of the power generating unit 7. The fan 71 blows cool air to the power generating unit 7 so as to cool the power generating unit 7. The heater 73 generates heat due to resistance by being supplied with power from a power supply (not shown) so as to heat the power generating unit 7. The temperature sensor 72 detects a temperature of the power generating unit 7 and sends a temperature detection signal S3 to the control unit 10A. The fan 71 supplies air to the cathode electrode of the MEA and is used as means for discharging the by-product.

As the mixed liquid fuel to be supplied to the anode electrode, liquid is used. Hereinafter, as an example of the mixed liquid fuel, methanol solution is assumed. The high concentration fuel tank 2 stores raw fuel (for example, methanol solution having a purity of 99.9% or more) or high concentration fuel containing a small amount of water (for example, mixed solution of methanol having a concentration of 10M or high and water). The high concentration fuel tank 2 can receive a supply of fuel from a supply port (not shown).

The mixing tank 4 communicates with the high concentration fuel tank 2 through line L1. The raw fuel or high concentration fuel from the high concentration fuel tank 2 and mixed solution returned from the anode electrode of the power generating unit 7 are mixed up in the mixing tank 4. The mixing tank 4 has a mechanism which allows itself to be filled with mixed liquid fuel internally. Then, the high concentration fuel tank 2 is mounted on the top of the mixing tank 4, so that when the liquid amount in the mixing tank 4 is reduced, the raw fuel or the high concentration fuel is replenished from the high concentration fuel tank 2 due to gravity. In the meantime, diluted methanol aqueous solution having an initial concentration in a range of 1.5M to 2.5M (mol/liter) is contained in the mixing tank 4 and the mixed liquid fuel is supplied by a difference of water head from the high concentration fuel tank 2 or a gas pressure from the mixing tank 4 to the power generating unit 7.

The vapor-liquid separating unit 41 is provided on the power generating unit 7. The vapor-liquid separating unit 41 has a vapor-liquid separating film for separating carbon dioxide from mixed solution. The vapor-liquid separating unit 41 is provided above the power generating unit 7 so as to discharge carbon dioxide using gravity through the vapor-liquid separating unit 41.

The mixing tank 4 has the concentration sensor 42 as means for detecting the concentration of the mixed liquid fuel. The concentration sensor 42 is installed at an appropriate place inside the mixing tank 4. However, the concentration sensor 42 is an arbitrary component of the present invention. This is because the concentration of fuel can be detected by software also instead of the concentration sensor (hardware). That is, a computer program for estimating the fuel concentration from information about output and temperature of the power generating unit 7 can be possessed by the control unit 10A. In the meantime, as the concentration sensor 42, for example, ultrasonic type or near-infrared multi-wavelength type concentration sensor may be used.

The power adjusting unit 8 is provided between the power generating unit 8 and the load 9 so as to fetch an output from the power generating unit 7 to the load 9 smoothly. A circuit of the power adjusting unit 8 is connected to the output side of the control unit 10 so as to control the load current I applied to the load 9. Meanwhile, electric power generated by the power generating unit 7 is output to the power adjusting unit 8 through a lead wire 81.

Although the fuel cell system 1A of this embodiment can be simplified because it does not always need the fuel supplying unit 5 or the air supplying unit 6, it cannot control the concentration of the mixed liquid fuel by operating the fuel supplying unit 5 and the air supplying unit 6 to change α, β like the fuel cell system 1 of the first embodiment. Further, because it does not always need the fuel supplying unit 3 either, it cannot always control the concentration of the mixed liquid fuel by operating the fuel supplying unit 3.

In this case, with a temperature T of the power generating unit 7 and the power adjusting unit 8 as operating amounts, the concentration of the mixed liquid fuel to be supplied to the anode electrode is controlled. To control the temperature T of the power generating unit 7, the revolution number of the fan 71 is adjusted to control the degree of cooling the power generating unit 7 while monitoring the temperature of the power generating unit 7 with the temperature sensor 72 (for example, thermocouple), or control the degree of heating the power generating unit 7 while adjusting energy supplied to the heater 73.

The concentration of the mixed liquid fuel is detected by the concentration sensor 42 according to results of FIGS. 10 and 11 and if the control unit 10A determines that the detected concentration of the mixed liquid fuel is high, the power adjusting unit 8 is operated to increase the load current I to be fetched from the power generating unit 7. At this time, an operation of raising the revolution number of the fan 71 or an operation of reducing energy to be supplied to the heater 73 is carried out. At this time, it is preferable to suppress reduction of the amount of the mixed liquid fuel in the mixing tank 4 by lowering the temperature of the power generating unit 7. If the amount of the mixed liquid fuel in the mixing tank 4 is reduced by increasing the load current I, raw fuel or high concentration fuel flows from the high concentration fuel tank 2 to the mixing tank 4 by an amount corresponding to the reduction, and consequently, consumption of the raw fuel or the high concentration fuel can be suppressed by reducing the temperature T.

Conversely, if the control unit 10A determines that the concentration of the detected mixed liquid fuel is low, the power adjusting unit 8 is operated to reduce the load current I to be fetched out of the power generating unit 7. At this time, an operation of reducing the revolution number of the fan 71 or an operation of increasing energy to be supplied to the heater 73 is carried out. It is preferable to raise the temperature T of the power generating unit 7 to suppress an increase in the amount of the mixed liquid fuel in the mixing tank 4. If the amount of the mixed liquid fuel in the mixing tank 4 is increased by increasing the load current I, the flow of the raw fuel or the high concentration fuel from the high concentration fuel tank 2 into the mixing tank 4 is decreased by an amount corresponding to that increase, and consequently, reduction of the concentration of the mixed liquid fuel in the mixing tank 4 can be suppressed by increasing the temperature T.

As a result, if the control unit determines that any one or both of the concentration and the amount of the mixed liquid fuel are abnormal depending on the concentration and the amount of the mixed liquid fuel, any one or both of the power generating unit temperature T and the load current I are controlled based on the correlation among the power generating unit temperature T, the load current value I, and $\alpha$, $\beta$, so as to control the concentration.

As well as in the above-described embodiment, the concentration and amount of the mixed liquid fuel can be controlled by combining five operating amounts, namely, fuel circulating unit, fuel supplying unit, air supplying unit, power adjusting unit (load current), and temperature adjusting means (power generating unit temperature) in various ways.

Fifth Embodiment

Figure 18:
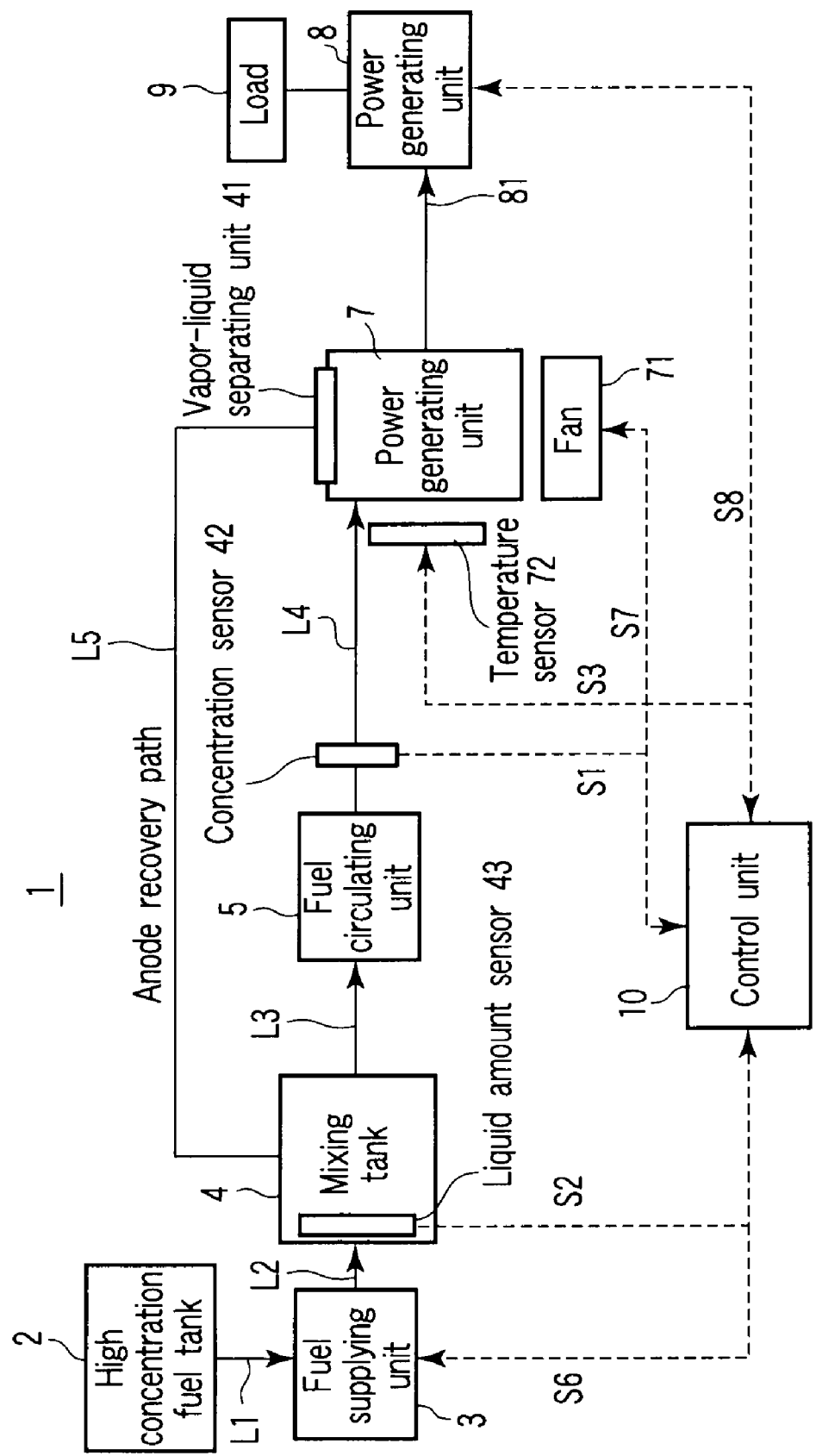
FIG. 18 is a block diagram showing a fuel cell system according to another embodiment in which the fuel cell system shown in FIG. 1 is modified.

FIG. 18 shows another embodiment in which the fuel cell system shown in FIG. 1 is modified.

The fuel cell system shown in FIG. 18 will be described simply by omitting a duplicated description thereof by attaching the same reference numerals as those attached to the system shown in FIG. 1. For any detailed description of each component, see the description of each one with the same reference numeral again. The fuel cell system shown in FIG. 18 includes the power generating unit 7 for generating electric power, the high concentration fuel tank 2 which stores methanol as fuel or methanol aqueous solution containing methanol and a small amount of water, and an auxiliary device necessary for generation of power. This auxiliary device includes the fuel supplying unit 3 for supplying high concentration fuel from the high concentration fuel tank 2, the mixing tank 4 which mixes the supplied high concentration fuel with recovered unreacted mixed solution, the fuel circulating unit 5 which circulates the fuel supplied from the mixing tank 4 and the load 9 to be supplied with electric power. Further, this auxiliary device includes the power adjusting unit 8 which adjusts electric power output from the power generating unit 7 and supplies it to the load, the control unit 10 for controlling respective units of the fuel cell system, the concentration sensor 42 for detecting the concentration of fuel supplied to the power generating unit 7, the liquid amount sensor 43 for detecting the amount of fuel in the mixing tank 4, the fan 71 which cools the power generating unit 7 and supplies air to the cathode side in the power generating unit 7 as described later and the temperature sensor 72 for monitoring the temperature of the power generating unit 7.

Here, the mixing tank 4 stores methanol aqueous solution having a predetermined concentration to be supplied to the power generating unit. The fuel circulating unit 5 feeds the methanol aqueous solution in the mixing tank 4 to the power generating unit 7 and returns the unreacted mixed solution to the mixing tank again. The fuel supplying unit 3 supplies fuel from the high concentration fuel tank 1 to the mixing tank. The power adjusting unit 8 adjusts an external load with respect to the power generating unit 7 corresponding to electric power condition required by the load 9. If an external power supply (external battery not shown here) is mounted as well as the power generating unit 7, electric power generated by the power generating unit 7 enables this external power supply (external battery) to be charged. The vapor-liquid separating unit 41 separates gas (carbon dioxide) generated by reaction of the power generating unit 7 from mixed solution and discharges the gas out of the power generating unit 7. The vapor-liquid separating unit 41 may be mounted inside the power generating unit 7 as shown in FIG. 18 or may be mounted in line L5 between the power generating unit 7 and the mixing tank 4 or inside the mixing tank 4. The concentration sensor 42 detects the concentration of fuel supplied to the power generating unit 7. Although in the system shown in FIG. 18, the concentration sensor 42 is provided in line L4 between the fuel circulating unit 5 and the power generating unit 7, it may be provided inside the mixing tank 4 or in line L3 or L4 between the mixing tank 4 and the fuel circulating unit 5. If concentration information indicating the concentration of fuel is checked from an output from the power generating unit 7 or the like, the concentration sensor 42 may not be provided. The liquid amount sensor 43 detects the amount of methanol aqueous solution inside the mixing tank 4. The temperature sensor 72 detects the temperature of the power generating unit 7, and the fan 71 controlled according to this detection cools the power generating unit 7 heated by electrochemical reaction generated within the power generating unit 7 so as to adjust the temperature of the power generating unit 7 and maintain it in a predetermined temperature range. Air supplied from the fan 71 is fetched into the cathode electrode side of the power generating unit 7 as breathing and methanol aqueous solution is fetched into the anode electrode side of the power generating unit 7 by the fuel circulating unit and then, generated electric power is supplied to the load 9 through the power adjusting unit 8.

Although the power generating unit 7 shown in FIG. 1 is supplied with air from the air supplying unit 6 through the line L6, the fuel cell system shown in FIG. 18 is provided with no air supplying unit 6 or lines L6, L7 while air is supplied from the fan 71 to the power generating unit 7 so as to cool the power generating unit 7 with air from the fan 71. Further, no concentration sensor 42 is provided on the mixing tank 43, and the line L4 for supplying fuel from the fuel circulating unit 5 to the power generating unit 7 is provided with the concentration sensor 42.

The power generating unit 7 is so constructed that its space on the cathode electrode side is open to outside to be suitable for air being supplied from the fan 71. That is, as disclosed in US Patent Application No. 2007/0072051A1 which corresponds to JP-A2007-95581 (KOKAI), a channel for supplying fuel is formed on the anode electrode side, so that fuel permeates the catalytic layer, electrolyte membrane and catalytic layer from this channel. The cathode electrode side is constructed of a channel plate composed of porous material and the cathode electrode side is exposed to external air. On the anode electrode side, carbon dioxide, hydrogen ion and electrons are generated by fuel, that is, electrochemical reaction of methanol and water and on the cathode side, oxygen contained in air supplied from the fan 71 reacts with hydrogen ion to produce water. The generated water is absorbed by the porous material on the cathode side and discharged into the supplied air. The carbon dioxide generated on the anode side is separated from the mixed solution (mixed solution of unreacted fuel not consumed on the anode electrode and water) by the vapor-liquid separating unit 41 provided in the power generating unit 7 and discharged outside. The mixed solution is returned to the mixing tank 4 through the line L5 serving as an anode recovery channel.

The structure of the power generating unit 7 shown in FIG. 18 is not limited to the structure disclosed in US Patent Application No. 2007/0072051A1 which corresponds to JP-A2007-95581 (KOKAI), but various types of structures, for example, the structure disclosed in US Patent Application No. 2006/0029851A1 may be adopted as long as the cathode side is open to outside so that air flow can be supplied from outside.

In the fuel cell system shown in FIG. 18, the fuel circulating unit 5 is operated so that the mixed liquid fuel is supplied from the mixing tank 4 to the anode electrode of the power generating unit 7 and air is supplied from the fan 71 to the cathode electrode. If the system 1 is connected to the load 9 through the power adjusting unit 8, generation of power is started, so that methanol and water make oxidation reaction on the anode electrode and methanol and water are consumed by traveling by crossover.

Mixed solution and carbon dioxide (reacted product) not consumed in the power generating unit 7 are supplied to the vapor-liquid separating unit 41. The mixed solution and carbon dioxide (unreacted product) are separated in this vapor-liquid separating unit 41 and the mixed solution is supplied to the line L5 and carbon dioxide (unreacted product) is discharged out of the power generating unit 7. The mixed solution is sent into the mixing tank 4 through the line L5. The fuel supplying unit 3 supplies the raw fuel to the mixing tank 4 or the high concentration fuel to the high concentration fuel tank 2 depending on the fuel level in the mixing tank 4. For example, raw fuel or high concentration fuel of the same flow rate as flux of methanol and water to be consumed in the power generating unit 7 is supplied to the mixing tank 4.

The concentration and amount of the mixed liquid fuel in the mixing tank 4 are measured by the sensors 42, 43 and its measurement data S1, S2 is sent to the control unit 10. The Control unit 10 controls the fuel circulating unit 5, the fuel supplying unit 3 and the fan 71 based on the measurement data S1, S2 and predetermined process data so that the concentration and amount of the mixed liquid fuel in the mixing tank 4 are appropriate. Thus, in the fuel cell system, mixed liquid fuel having an appropriate concentration is supplied to the power generating unit 7 at an appropriate supplying rate and electric power is output from the power generating unit 7 under an optimum condition.

Next, a method of controlling the concentration of fuel to be supplied to the power generating unit 7 in the fuel cell system shown in FIG. 18 and a method of controlling the amount of methanol aqueous solution fuel stored in the mixing tank 4 will be described.

Figure 19:
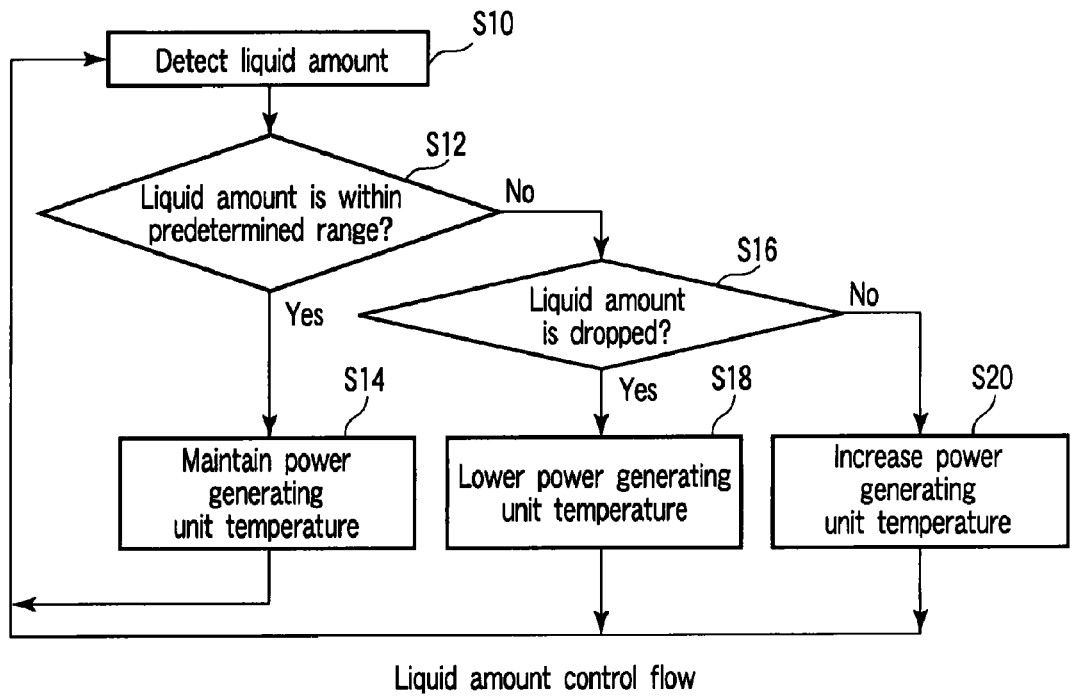
FIG. 19 is a flow chart for controlling the flow rate of fuel in the fuel cell system shown in FIG. 18.
Figure 20:
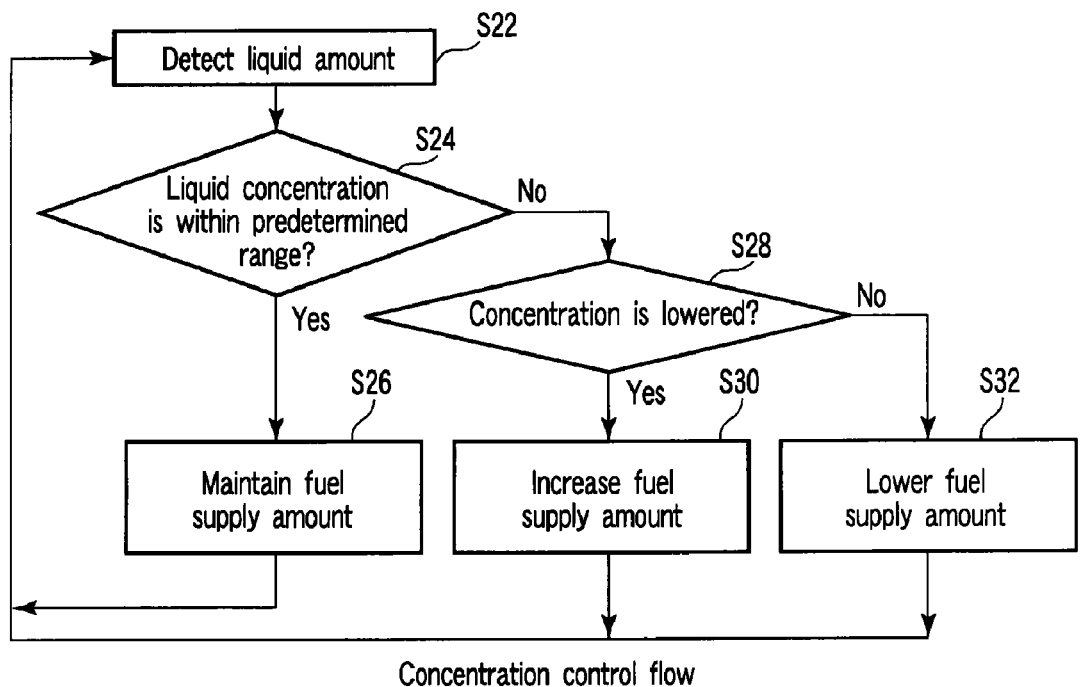
FIG. 20 is a flow chart for controlling the concentration of fuel in the fuel cell system shown in FIG. 18.

The method of controlling the fuel concentration and the method of controlling the fuel amount are shown in FIGS. 19 and 20 and can be executed independently during an operation of the fuel cell system, so that the fuel concentration and the fuel amount are controlled independently. FIGS. 21 and 22 show a flow chart for adjusting an external load to the power generating unit 7 in order to control the temperature of the power generating unit 7 in relation with processing of FIGS. 19 and 20.

The control method of FIGS. 19 and 20 and the temperature control method of FIGS. 21 and 22 may be adopted not only to the fuel cell system shown in FIG. 18 but also to the fuel cell system shown in FIG. 1 and apparently, in the fuel cell system shown in FIG. 1, the fuel concentration and the fuel amount may be controlled independently.

In the liquid amount control shown in FIG. 19, first, the liquid amount sensor 43 detects the amount of liquid in the mixing tank 4 as shown in step S10. Then, whether or not the liquid amount is within a predetermined range is determined based on a sensor signal S2 from the liquid amount sensor 43 as shown in step S12. If the amount of liquid in the mixing tank 4 is within a predetermined range in step S12, an appropriate amount of liquid can be supplied continuously from the mixing tank 4 to the power generating unit 7. Thus, the temperature of the power generating unit 7 is maintained so as to continue an operation of the fuel cell system as shown in step S14. To maintain the temperature of the power generating unit 7, the operation of the fan 71 is controlled based on the sensor signal S3 from the temperature sensor 72. That is, the fan 71 is controlled to maintain the level of the sensor signal S3 from the temperature sensor 72 so as to adjust the volume of feeding air.

On the other hand, if the amount of liquid in the mixing tank 4 is not within the predetermined range in step S12, and the amount of liquid is dropped as shown in step S16, appropriate amount of liquid cannot be supplied continuously from the mixing tank 4 to the power generating unit 7. Thus, the temperature of the power generating unit 7 is dropped as shown in step S18. To drop the temperature of the power generating unit 7, the flow rate of the fan 71 is increased based on the sensor signal S3 from the temperature sensor 72.

As described with reference to FIG. 21, the generation of heat from the power generating unit 7 decreases as the load of an external circuit containing the load 9 connected to the power generating unit 7 is dropped. Therefore, the load of the external circuit containing the load 9 is dropped, so that the temperature of the power generating unit 7 can be reduced. When the temperature of the power generating unit 7 is reduced, consumption of fuel is dropped, thereby suppressing reduction of the amount of liquid in the mixing tank 4.

If in step S12, the amount of liquid in the mixing tank 4 is not within the predetermined range and further, in step S16, the amount of liquid in the mixing tank 4 is not reduced but increased, the temperature of the power generating unit 7 is increased as shown in step S20. To raise the temperature of the power generating unit 7, the revolution number of the fan 71 is reduced based on the sensor signal S3 from the temperature sensor 72 so that the flow rate of air supplied form the fan 71 is reduced. When the temperature of the power generating unit 7 is raised, consumption of fuel in the power generating unit 7 is increased, so as to reduce the amount of liquid in the mixing tank 4.

Because the heat amount of the power generating unit 7 is increased with an increase in load as will be described with reference to FIG. 22, the temperature of the power generating unit 7 can be raised by increasing the load of an external circuit containing the load 9 connected to the power generating unit 7. Additionally, it is permissible to provide a heater (not shown) on the power generating unit 7 so that the heater temperature is adjusted based on the sensor signal S3 from the temperature sensor 72 so as to raise the temperature of the power generating unit 7.

If the temperature of the power generating unit 7 is lowered by reducing the external load as described above, an instruction signal S8 for the control unit 10 to lower the temperature of the power generating unit 7 as shown in step S40 of FIG. 21 is output to the power adjusting unit 8. The power adjusting unit 8 is moved to load adjusting action according to this instruction signal S8. According to an output from the temperature sensor 72, the control unit 10 gives a control signal S8, instructing the value of a load specified preliminarily to the power generating unit 7, to the power adjusting unit 8. According to this control signal S8, the power adjusting unit 8 changes over the internal circuit so as to adjust the value of an external load containing the load 9, so that the value of the external load containing the load 9 connected to the power generating unit 7 is changed to a lower value, step S42. After the external load is changed over, electric power fetched out of the power generating unit 7 is detected by the power adjusting unit 8. If in step S44, output electric power is not short, the operation of the system is continued, step S48, as shown in FIG. 48 and electric power is fetched out of the power generating unit 7 with a selected external load. If the output electric power is short in step S44, an auxiliary power from an external power supply (not shown), for example, an external battery is adjusted by the power adjusting unit 8 and output to the load 9 as shown in step S46.

By quickly lowering the temperature of the power generating unit 7, as shown in FIG. 11, the liquid amount is increased gradually. If the liquid amount sensor detects a liquid amount, detecting that the liquid amount is returned to the predetermined range, the temperature of the power generating unit 7 is returned to a predetermined temperature and then, the operation is continued.

When the temperature of the power generating unit 7 is raised by increasing the external load as described above, the control unit 10 outputs an instruction signal S8 for raising the temperature of the power generating unit 7 to the power adjusting unit 8 as shown in step S50 of FIG. 22. The power adjusting unit 8 is moved to load adjusting action according to this instruction signal S8. According to the output from the temperature sensor 72, as shown in step S52, the control unit 10 gives a control signal S8, instructing a load value specified preliminarily for the power generating unit 7, to the power adjusting unit 8 as shown in step S52. According to this control signal S8, the power adjusting unit 8 changes over the internal circuit so as to adjust the value of the external load containing the load 9, so that the value of the external load containing the load 9 connected to the power generating unit 7 is changed over to a larger value. After the external load is changed over, electric power fetched out of the power generating unit 7 is detected by the power adjusting unit 8. Unless the output power is excessive in step S54, the operation of the system is continued as shown in step S56 so as to fetch out electric power from the power generating unit 7 with a selected external load. If the output electric power is excessive in step S54, as shown in step S58, excessive power output through the power adjusting unit 8 is supplied to an external power supply (not shown), for example, an external battery, so that the external power supply is charged.

By raising the temperature of the power generating unit 7 rapidly, as shown in FIG. 11, the amount of liquid is reduced gradually. Then, if the liquid amount sensor detects an amount of liquid, detecting that the amount of liquid is returned to a predetermined range, the temperature of the power generating unit is returned to a predetermined temperature, thereby continuing the operation.

In the concentration control shown in FIG. 20, the concentration of fuel is detected based on a sensor output from the concentration sensor 42 as shown in step S22. If the fuel cell system shown in FIG. 1 or FIG. 18 has no concentration sensor 42, in step S22, an output electric power from the power generating unit 7 is monitored by the power adjusting unit 8 and the concentration is estimated based on this output electric power by the control unit 10. In step S24, whether or not a detected concentration or an estimated concentration is within a predetermined range is determined. If the detected concentration or the estimated concentration is within the predetermined range, the fuel supplying unit 3 is controlled so as to maintain the fuel supply amount as it is and the operation is continued.

On the other hand, in step S24, if the detected concentration or the estimated concentration is not within the predetermined range while the concentration is dropped, the fuel supplying unit 3 is controlled as shown in step S30, so as to increase the amount of fuel supply from the fuel supplying unit 3 more than a predetermined value. High concentration fuel is supplied from the fuel supplying unit 3 to the mixing tank 4 so as to increase the concentration of fuel. With the supply amount of the high concentration fuel increased, as shown in step S22, the concentration of fuel is detected again continuously. If in step S24, the concentration is returned to the predetermined range, the increase of the fuel supply amount from the fuel supplying unit 3 is stopped in step S26 and the fuel supply amount is returned to the predetermined value and that supply amount is maintained. If in step S28, it is made evident that the concentration of fuel is increased, the fuel supplying unit 3 is controlled as shown in step S32 so as to reduce the fuel supply amount with respect to the predetermined value. With the supply amount of the high concentration fuel reduced, the fuel concentration is detected continuously as show in step S22. If the fuel concentration is returned to the predetermined range, in step S26, decrease of the fuel supply amount from the fuel supplying unit 3 is stopped and the fuel supply amount is returned to the predetermined value, and then, that supply amount is maintained.

FIGS. 23 to 25 show an example of the fuel cell system operated based on a flow chart of FIGS. 19 and 20. It is assumed that the flow rate of the fuel circulating unit 5 is substantially constant during an operation. When as shown in FIG. 23, the external load was reduced in a period of 40 minutes to 90 minutes after the operation was started so as to lower the temperature of the power generating unit 7 to a lower temperature than a predetermined one of 60° C., the amount of the fuel could be increased as shown in FIG. 24. Next, if the external load was increased in a period of 110 minutes to 160 minutes after the operation was started so that the temperature of the power generating unit 7 was increased from the predetermined temperature of 60° C., the amount of the fuel could be reduced as shown in FIG. 24. As shown in FIG. 25, the concentration of fuel could be maintained within a predetermined range by adjusting the fuel supply amount by operating the fuel supplying unit 3 independently as shown in FIG. 20. Due to temperature control of the power generating unit 7 and because the concentration of fuel supplied to the power generating unit 7 can be controlled, the fuel cell system can operate with a high power generation efficiency for a long period.

Sixth Embodiment

FIG. 26 shows another embodiment in which the fuel cell system shown in FIG. 18 is modified. In FIG. 26, the same reference numerals as those in FIGS. 1 and 18 are attached to the same portion and location and any duplicated description thereof is omitted.

The fuel cell system shown in FIG. 26 includes the power generating unit 7, the high concentration fuel tank 2 which stores methanol as fuel or methanol aqueous solution containing methanol and a small amount of water, and an auxiliary device necessary for generation of power. This auxiliary device includes the fuel supplying unit 3, the fuel circulating unit 5, the power adjusting unit 8, the load 9, the control unit 10, the concentration sensor 42, the fan 71 and the temperature sensor 72.

The fuel cell system shown in FIG. 26 is provided with no mixing tank 4 or liquid amount sensor 43 unlike the fuel cell system shown in FIG. 18 and unreacted mixed solution from the vapor-liquid separating unit 41 is returned directly to the line L3 through the line L5. Here, the high concentration fuel tank 2 has a structure in which a predetermined pressure is applied to the fuel supplying unit 3. The fuel supplying unit 3 supplies fuel stored in the high concentration fuel tank and shuts down the supply. That is, if the pressure of fuel circulated through the line L3 is dropped, the fuel supplying unit 3 supplies fuel stored in the high concentration fuel tank. If the pressure of fuel circulated through the line L3 rises, the fuel supplying unit 3 stops supply of fuel stored in the high concentration fuel tank. Therefore, the pressure of fuel supplied from the line L3 to the fuel circulating unit 5 is maintained substantially constant, so that the pressure of fuel supplied to the power generating unit 7 is maintained substantially constant while the pressure of fuel circulated is also maintained substantially constant. The auxiliary device has the function described in FIGS. 1 and 18.

If reaction occurs in the power generating unit 7, methanol aqueous solution is consumed due to reaction and crossover, and the volume of methanol aqueous solution circulating in the anode circulating line is reduced by a corresponding amount. Because the high concentration fuel tank 2 has a structure having a predetermined pressure with respect to the fuel supplying unit 3, if the volume of the circulating line is reduced by consumption in the power generating unit 7, the high concentration fuel in the high concentration fuel tank 2 is sent to the fuel supplying unit side through the line L2 only by an amount corresponding to the reduced volume.

In this system, the volume of methanol aqueous solution circulating through the anode circulating line is always maintained constant. However, if balance between the consumption of fuel in the power generating unit 7 and supply of fuel from the high concentration fuel tank 2 is lost, the concentration of methanol aqueous solution supplied to the power generating unit 7 is changed, so that if the concentration is deflected from the predetermined range, the power generation efficiency is dropped. Thus, the temperature of the power generating unit 7 and the load to be fetched out of the power generating unit 7 are controlled so that the concentration of the fuel falls in the predetermined range.

Figure 27:
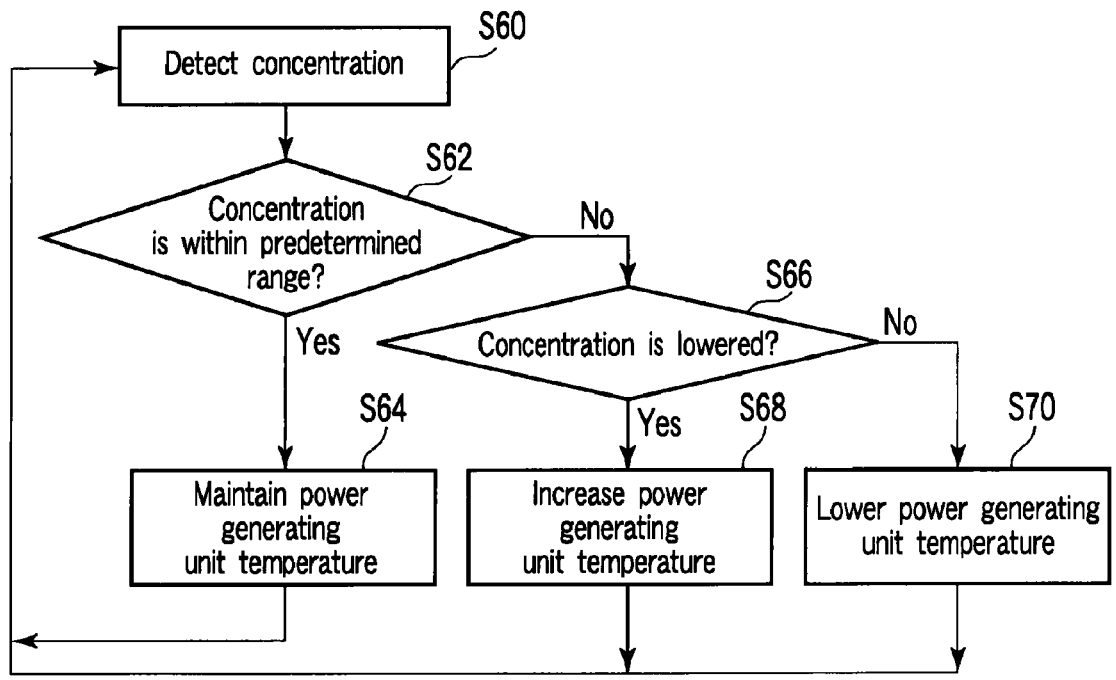
FIG. 27 is a flow chart showing processing for controlling the concentration of fuel in the fuel cell system shown in FIG. 26.

FIG. 27 shows the concentration control method of the fuel cell system shown in FIG. 26. As shown in step S60 of FIG. 27, a fuel concentration is always detected by the concentration sensor 42 and a concentration sensor signal from this sensor 42 is provided to the control unit 10 to monitor the fuel concentration. The Control unit 10 determines whether or not the detected concentration value is within the predetermined range based on the concentration sensor signal. Here, if it is determined that the detected concentration is within the predetermined range as shown in step S62, the system is controlled so that the temperature of the power generating unit 7 is maintained as it is as shown in step S64. If in step S62, it is determined that the detected concentration is not within the predetermined range and the concentration is dropped as shown in step S66, the system is controlled so as to increase the temperature of the power generating unit 7 as shown in step S68. To increase the temperature of the power generating unit 7, the fan 71 is controlled as described previously so as to reduce the cooling performance of the power generating unit 7. The fan 71 is controlled and/or the power adjusting unit 8 is controlled so as to adjust the external load thereby increasing the amount of heat generation of the power generating unit 7. Additionally, to increase the temperature of the power generating unit 7, it is permissible to energize a heater (not shown) provided on the power generating unit 7 to heat the power generating unit 7. If the temperature of the power generating unit 7 is increased, the amount of liquid in the anode circulating line is reduced largely with respect to the concentration as compared with a temperature before it is increased, as shown in FIG. 11. Accompanied by the reduction of the concentration, the supply amount of the high concentration fuel from the fuel supplying unit 3 is increased. Because as shown in FIG. 7, the concentration increase amount with respect to the fuel supply amount from the high concentration fuel tank is larger as compared with the increase of the liquid amount, the concentration is inclined to be increased. Then, this condition is maintained until the concentration falls in the predetermined range and when the detected concentration is restored into the predetermined range, the temperature of the power generating unit 7 is returned to the predetermined temperature.

On the other hand, if in step S62, the control unit 10 determines that the detected concentration is not within the predetermined range and is being increased, the system is controlled to reduce the temperature of the power generating unit 7. To reduce the temperature of the power generating unit 7, the amount of air feeding from the fan 71 is raised so as to intensify the cooling performance of the power generating unit 7 as described previously. Alternatively, the power adjusting unit 8 is controlled so that the external load is reduced to drop the amount of heat generated in the power generating unit 7. If the temperature of the power generating unit 7 is lowered, the amount of liquid in the anode circulating line is increased as compared with a case under a temperature before the temperature is dropped, thereby decreasing the supply amount of the high concentration fuel from the fuel supplying unit 3. Then, this condition is maintained until the detected concentration reaches the predetermined range and if the detected concentration reaches the predetermined range, a control of returning the temperature of the power generating unit 7 to the predetermined temperature is carried out.

Figure 28:
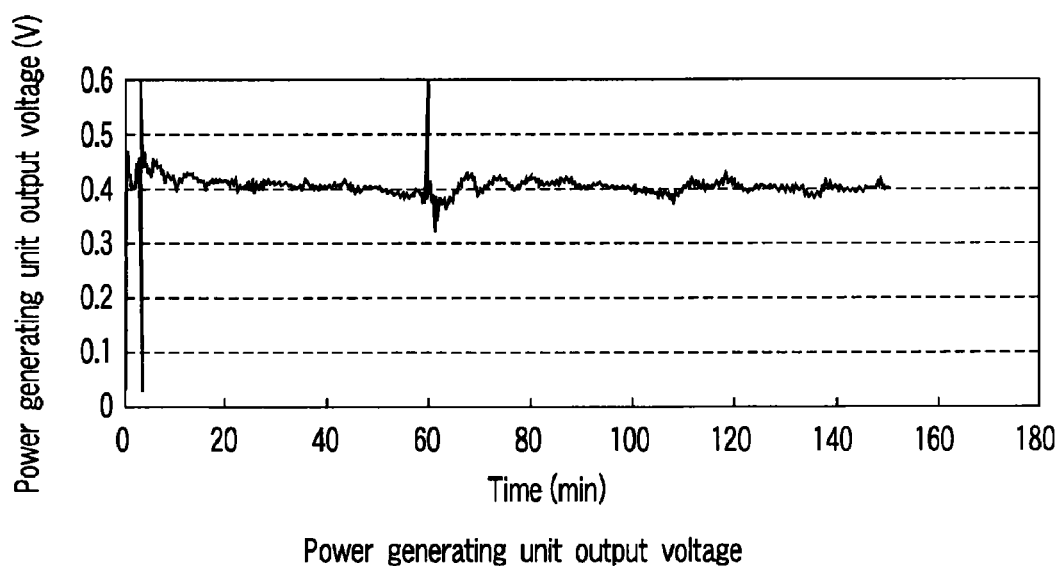
FIG. 28 is a graph showing changes over time of output voltage from the power generating unit in the fuel cell system shown in FIG. 26.
Figure 29:
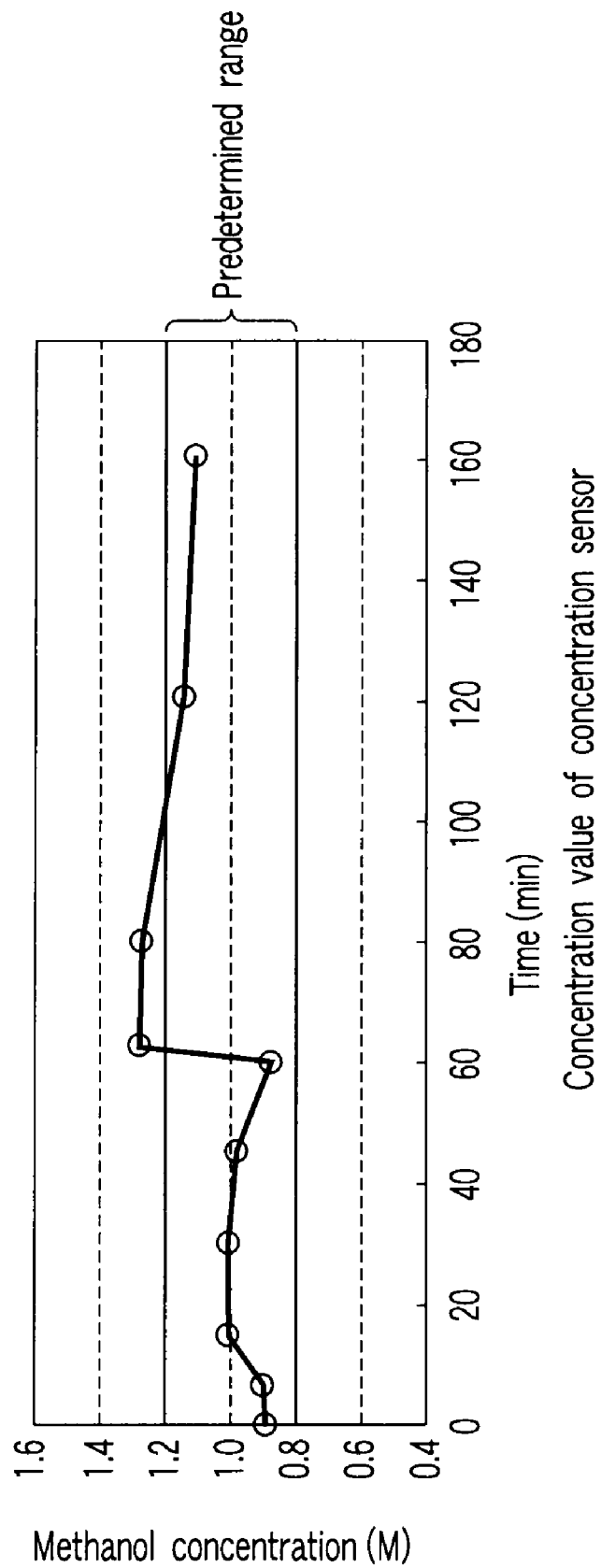
FIG. 29 is a graph showing changes in the concentration of methanol output from a concentration sensor in the fuel cell system shown in FIG. 26 with respect to changes over time of the output voltage from the power generating unit shown in FIG. 28.

FIGS. 28 and 29 show an example of the fuel cell system operated based on the flow chart of FIG. 27. In this operation, the predetermined operating temperature was set to 60° C. and the external load was set to about 1.8 A. During the operation, the flow rate of the fuel in the fuel circulating unit 5 was set to the predetermined value and maintained substantially constant. Although the concentration of the fuel was raised when 60 minutes elapsed after the operation was started as shown in FIG. 29, the rise of the concentration of the fuel could be suppressed into the predetermined concentration range by reducing the external load to lower the temperature of the power generating unit 7 from the predetermined temperature of 60° C. As a result, in the system shown in FIG. 26, stable operation having a high power generation efficiency can be carried out for a long period as shown in FIG. 28.

In the system shown in FIG. 26, when generation of power is stopped or abnormality occurs, a stop signal ST10 is sent from the control unit 10 to the fuel supplying unit 3 so as to stop supply of fuel from the fuel supplying unit 3 to the line L2. That is, when the generation of power is stopped or abnormality occurs, the stop signal ST10 from the control unit 10 is supplied so as to stop supply of fuel, and stop signals S4, S8 are transmitted to the fuel circulating unit 5 and the power adjusting unit 8 so as to stop circulation of fuel. Further, the external load containing the load 9 on the power generating unit 7 is adjusted by the power adjusting unit 8 so as to stop generation of power.

In the meantime, the flow chart of FIG. 27 may be applied not only to the system of FIG. 26 but also to the system of FIG. 18. For example, if the concentration detected by the concentration sensor 42 is lower than the predetermined range, the system of FIG. 18 carries out processing of increasing the temperature of the power generating unit 7 based on the flow chart of FIG. 27. Because if the temperature is raised, the amount of liquid in the mixing tank 4 is decreased as shown in FIG. 11, the high concentration fuel is supplied from the high concentration fuel tank 2 to the mixing tank 4 by an amount corresponding to that decrease in order to maintain the amount of liquid within the predetermined range by preventing the reduction of the liquid amount. Consequently, the concentration of fuel in the mixing tank 4 is increased.

As well as in the above-described embodiment, by combining five operating amounts, namely, the fuel circulating unit, the fuel supplying unit, the air supplying unit, the power adjusting unit (load current), and temperature adjusting means (power generating unit temperature) in various ways, any one or both of the concentration and amount of the mixed liquid fuel can be controlled.

According to the embodiments of the present invention, a necessity of providing any water tank or water recovery path for adjusting the concentration and amount of the mixed liquid fuel independently is eliminated, thereby simplifying the structure to lead to reduction in size of the system.

According to the present invention, a fuel cell system having a high fuel usage efficiency and a smaller size can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell system comprising:
    a power generating unit which generates an electric power and includes an anode, a cathode and an electrolyte membrane provided between the anode and the cathode, wherein mixture fuel having a fuel concentration is supplied to the anode, the cathode is made into contact with air, the electric power is output from between the anode and the cathode by electrochemical reaction, and unreacted fuel is discharged from the anode;
    a fuel circulating path which circulates the unreacted fuel from the power generating unit to the anode;
    a fuel supplying unit which supplies high concentration fuel having a concentration not lower than 10M to the fuel circulating path so as to add the high concentration fuel to the unreacted fuel to produce the mixture fuel, the high concentration fuel being supplied depending on a reduction of pressure of the mixture fuel;
    a fuel circulating unit which circulates the mixture fuel in the anode; and
    a control unit which controls a temperature of the power generating unit according to the fuel concentration of the mixture fuel supplied to the anode.

2. The fuel cell system according to claim 1, further comprising:
    a concentration sensor which detects the fuel concentration of the mixture fuel supplied to the anode to generate a concentration signal,
    wherein the control unit controls the temperature of the power generating unit depending on the concentration signal.

3. The fuel cell system according to claim 1, wherein the control unit estimates the fuel concentration of the mixture fuel supplied to the anode based on the electric power output from the power generating unit to control the temperature of the power generating unit.

4. The fuel cell system according to claim 1, wherein when the fuel concentration of the mixture fuel is within a predetermined range, the control unit maintains the temperature of the power generating unit.

5. The fuel cell system according to claim 1, wherein when the fuel concentration of the mixture fuel is dropped, the temperature of the power generating unit is increased.

6. The fuel cell system according to claim 5, further comprising:
    a power adjusting unit which adjusts the electric power output from the power generating unit,
    wherein the control unit controls the power adjusting unit to increase an external load connected to the power generating unit, thereby increasing the temperature of the power generating unit.

7. The fuel cell system according to claim 1, wherein when the fuel concentration of the mixture fuel is increased from a predetermined range, the control unit decreases the temperature of the power generating unit.

8. The fuel cell system according to claim 7, further comprising:
    a power adjusting unit which adjusts electric power output from the power generating unit,
    wherein the control unit controls the power adjusting unit to decrease an external load connected to the power generating unit, thereby decreasing the temperature of the power generating unit.

9. The fuel cell system according to claim 1, wherein the high concentration fuel is methanol.

10. A fuel cell system comprising:
    a power generating unit which generates an electric power and includes an anode, a cathode and an electrolyte membrane provided between the anode and the cathode, wherein mixture fuel having a fuel concentration is supplied to the anode, the cathode is made into contact with air, the electric power is output from between the anode and the cathode by electrochemical reaction, and unreacted fuel is discharged from the anode;
    a fuel supplying unit which supplies high concentration fuel having a concentration not lower than 10M;
    a tank which is provided in a fuel circulating path for circulating unreacted fuel from the power generating unit to the anode and stores the mixture fuel obtained by mixing the high concentration fuel supplied from the fuel supplying unit with the unreacted fuel;
    a fuel circulating unit which circulates the mixture fuel from the tank to the anode; and
    a control unit which controls a temperature of the power generating unit according to an amount of the mixture fuel in the tank.

11. The fuel cell system according to claim 10, further comprising:
    a liquid amount sensor which detects the amount of the mixture fuel stored in the tank to generate a liquid amount detection signal.

12. The fuel cell system according to claim 10, wherein the control unit maintains the temperature of the power generating unit when the amount of the mixture fuel is within a predetermined range.

13. The fuel cell system according to claim 10, wherein when the amount of the mixture fuel is dropped from a predetermined range, the control unit lowers the temperature of the power generating unit.

14. The fuel cell system according to claim 13, further comprising:
    a power adjusting unit which adjusts the electric power output from the power generating unit,
    wherein the control unit controls the power adjusting unit to decrease an external load connected to the power generating unit, thereby decreasing the temperature of the power generating unit.

15. The fuel cell system according to claim 10, wherein, when the amount of the mixture fuel is increased from a predetermined range, the control unit raises the temperature of the power generating unit.

16. The fuel cell system according to claim 15, further comprising:
a power adjusting unit which adjusts the electric power output from the power generating unit,
wherein the control unit controls the power adjusting unit to increase an external load connected to the power generating unit, thereby increasing the temperature of the power generating unit.

17. The fuel cell system according to claim 10, further comprising:
a fan which supplies air for cooling the power generating unit to the power generating unit,
wherein the control unit controls the fan to control the temperature of the power generating unit and to supply air to the cathode.

18. The fuel cell system according to claim 10, wherein the power generating unit includes a heater which heats the power generating unit, and the control unit controls the heater to control the temperature of the power generating unit.

19. The fuel cell system according to claim 10, wherein the control unit estimates the fuel concentration of the mixture fuel supplied to the anode based on the electric power output from the power generating unit so as to control the temperature of the power generating unit.

20. The fuel cell system according to claim 10, wherein when the fuel concentration of the mixture fuel is within a predetermined range, the control unit maintains the temperature of the power generating unit.

21. The fuel cell system according to claim 10, wherein when the fuel concentration of the mixture fuel is dropped from a predetermined range, the control unit increases the temperature of the power generating unit.

22. The fuel cell system according to claim 21, further comprising:
a power adjusting unit which adjusts the electric power output from the power generating unit,
wherein the control unit controls the power adjusting unit so as to increase an external load connected to the power generating unit, thereby increasing the temperature of the power generating unit.

23. The fuel cell system according to claim 10, wherein when the fuel concentration of the mixture fuel is increased from a predetermined range, the control unit decreases the temperature of the power generating unit.

24. The fuel cell system according to claim 23, further comprising:
a power adjusting unit which adjusts the electric power output from the power generating unit,
wherein the control unit controls the power adjusting unit so as to decrease an external load connected to the power generating unit, thereby decreasing the temperature of the power generating unit.

25. The fuel cell system according to claim 10, wherein the high concentration fuel is methanol.

26. The fuel cell system according to claim 23, wherein the high concentration fuel is methanol.

* * * * *